US012692873B1

(12) United States Patent
Wood et al.

(10) Patent No.: US 12,692,873 B1
(45) Date of Patent: Jul. 28, 2026

(54) AIRFOILS AND AIRFOIL ASSEMBLIES WITH TRAILING EDGE FEATURES

(71) Applicant: General Electric Company, Evendale, OH (US)

(72) Inventors: Trevor H. Wood, Clifton Park, NY (US); Kishore Ramakrishnan, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/421,901

(22) Filed: Dec. 16, 2025

(51) Int. Cl.
*F01D 5/14* (2006.01)
*F04D 19/00* (2006.01)
*F04D 29/32* (2006.01)

(52) U.S. Cl.
CPC ......... *F04D 29/324* (2013.01); *F04D 19/002* (2013.01); *F05D 2200/11* (2013.01); *F05D 2200/13* (2013.01); *F05D 2200/14* (2013.01); *F05D 2200/221* (2013.01); *F05D 2220/36* (2013.01); *F05D 2240/304* (2013.01)

(58) Field of Classification Search
CPC . F01D 5/14; F01D 5/141; F01D 5/145; F01D 5/147; F01D 9/041; F01D 9/065; F04D 29/234; F04D 29/388; F04D 29/384; F04D 19/002; F02K 1/66; F05D 2220/36;
(Continued)

(56) References Cited

U.S. PATENT DOCUMENTS 4,089,618 A 5/1978 Patel
6,733,240 B2 5/2004 Gliebe
(Continued)

FOREIGN PATENT DOCUMENTS

FR 3129428 A1 5/2023
FR 3129436 A1 5/2023
(Continued)

OTHER PUBLICATIONS

"Optimization of Trailing-Edge Serrations to Reduce Open-Rotor Tonal Interaction Noise"; Robert Jaron, et al.; Journal of Fluids Engineering, v. 140, Feb. 2018; 8 pgs.
(Continued)

*Primary Examiner* — Nathaniel E Wiehe
*Assistant Examiner* — Maxime M Adjagbe
(74) *Attorney, Agent, or Firm* — Dority & Manning, P.A.

(57) ABSTRACT

An airfoil assembly for turbine engines is provided. The airfoil assembly includes a plurality of airfoils and an airfoil includes a first surface defining a pressure side and a second surface defining a suction side, a plurality of first chord sections defining at least one first chord length, a plurality of second chord sections defining at least one second chord length, and a plurality of wave-shaped projections extending along the trailing edge. The plurality of wave-shaped projections each define a wave peak and a wave trough. The wave-shaped projections have an amplitude that is a proportion of an average local chord length of the airfoil. The wave-shaped projections may be designed according to a relationship to power coefficient, fan pressure ratio, and/or thrust coefficient of a turbine engine to produce an airfoil with a sculpted trailing edge feature that reduces noise during operation of the turbine engine.

20 Claims, 12 Drawing Sheets

(58) Field of Classification Search
CPC ............. F05D 2200/11; F05D 2200/13; F05D 2200/14; F05D 2200/221
See application file for complete search history.

(56) References Cited

U.S. PATENT DOCUMENTS

| | | | |
|---|---|---|---|
| 8,083,487 | B2 * | 12/2011 | Wood .................... F04D 29/324 416/223 R |
| 9,121,294 | B2 * | 9/2015 | Kray ....................... F01D 5/141 |
| 10,301,942 | B2 | 5/2019 | Joseph |
| 10,465,520 | B2 | 11/2019 | Vandeputte |
| 10,611,468 | B2 | 4/2020 | Sullivan |
| 10,746,157 | B2 | 8/2020 | Wang |
| 10,767,623 | B2 | 9/2020 | Wang |
| 11,236,722 | B2 | 2/2022 | Oerlemans |
| 12,000,344 | B2 | 6/2024 | Levisse |
| 12,305,579 | B2 | 5/2025 | Taillant |
| 12,313,081 | B2 | 5/2025 | Frantz |
| 12,320,305 | B2 | 6/2025 | Martinez Luque |
| 12,378,933 | B2 | 8/2025 | Fefermann |
| 2024/0328320 | A1 | 10/2024 | Ramakrishnan |
| 2024/0410319 | A1 | 12/2024 | Becoulet |
| 2025/0018895 | A1 | 1/2025 | Howell |
| 2025/0052165 | A1 | 2/2025 | Becoulet |
| 2025/0075636 | A1 | 3/2025 | Frantz |
| 2025/0101930 | A1 | 3/2025 | Auriol |
| 2025/0116203 | A1 | 4/2025 | Olivier |
| 2025/0129724 | A1 | 4/2025 | Millier |
| 2025/0137407 | A1 | 5/2025 | Becoulet |
| 2025/0188951 | A1 | 6/2025 | Lebeault |
| 2025/0197014 | A1 | 6/2025 | Gea Aguilera |

FOREIGN PATENT DOCUMENTS

| | | | |
|---|---|---|---|
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |

OTHER PUBLICATIONS https://www.smart-blade.com/serrations; Smart Blade GMBH, Copyright 2023; 6 pgs.

J Mathew et al 2016 J. Phys.: Conf. Ser. 753 022019; LM Wind Power; 13 pgs.

* cited by examiner

AIRFOILS AND AIRFOIL ASSEMBLIES WITH TRAILING EDGE FEATURES

TECHNICAL FIELD

This application is generally directed to gas turbine engines, and more particularly, to airfoils of gas turbine engines.

BACKGROUND

A gas turbine engine typically includes a fan and a turbomachine. The turbomachine generally includes an inlet, one or more compressors, a combustor, and at least one turbine. The compressors compress air, which is channeled to the combustor where it is mixed with fuel. The mixture is then ignited for generating hot combustion gases. The combustion gases are channeled to the turbine(s), which extract(s) energy from the combustion gases for powering the compressor(s), as well as for producing useful work to propel an aircraft in flight. The turbomachine is mechanically coupled to the fan for driving the fan during operation. During operation of the gas turbine engine, airfoils forming fan blades and compressor rotor blades are rotated to accelerate an airflow though the gas turbine engine.

BRIEF DESCRIPTION OF DRAWINGS

Various needs are at least partially met through provision of a noise reducing trail edge airfoil feature, as described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which.

Figure 1:
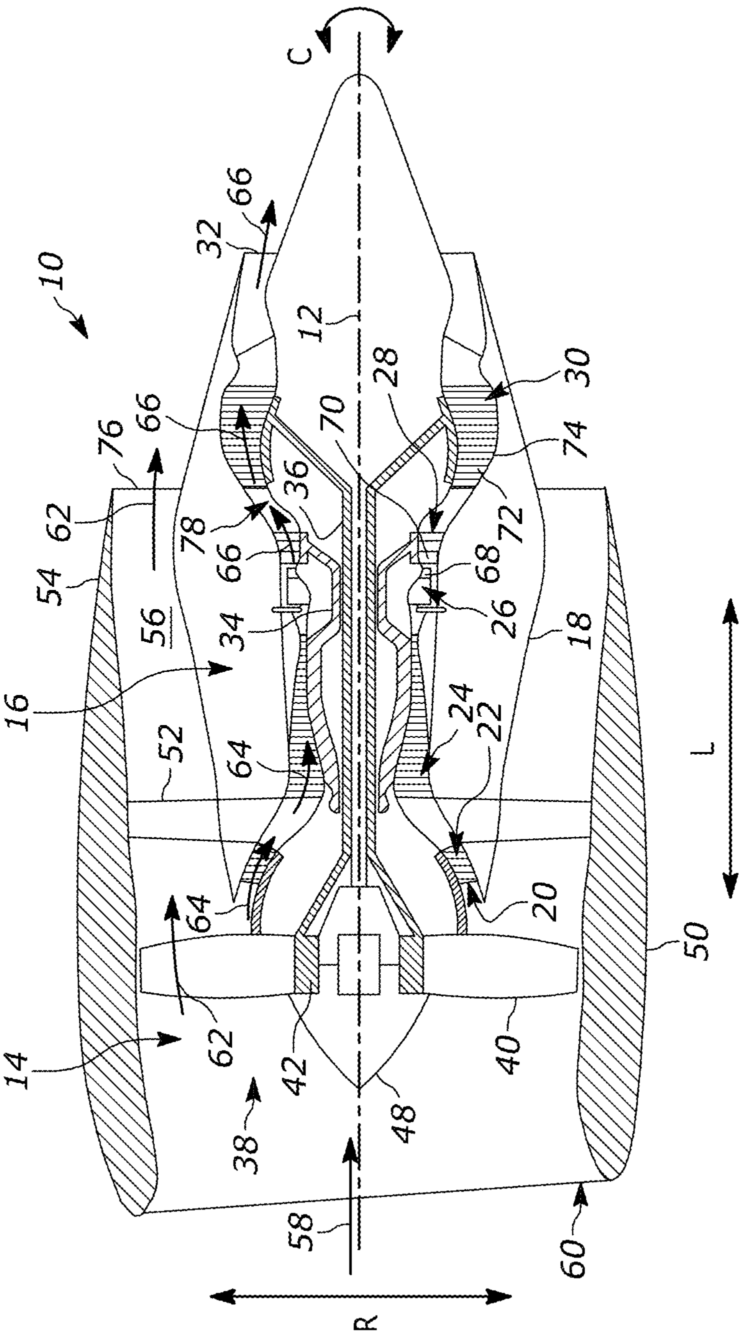
FIG. 1 is a cross-sectional view of a turbine engine with an airfoil assembly in accordance with various embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

This disclosure generally provides examples of airfoils and methods for designing an airfoil for use in an aircraft engine. The embodiments described herein are not limiting, but rather are examples only. It should be understood that the disclosure may apply to any type of airfoil or aerodynamic surface, such as, but not limited to, fan blades, rotor blades, stator blades, ducted fan blades, unducted fan blades, struts, vanes, exhaust ducts, and/or nozzle assemblies. More specifically, the disclosure may apply to any airfoil, or aerodynamic surface, that generates a wake downstream from the airfoil. Although the embodiments described herein are generally described in connection with a turbine engine, it should be apparent to those skilled in the art that, with appropriate modification, the apparatus and methods described herein can be suitable for any device including airfoils that generate wakes downstream from the airfoil.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise. Reference throughout this specification to "one embodiment," "an embodiment," "some embodiments", "one form," "a form," "some forms", "an implementation", "some implementations", "some applications", or similar language means that a particular feature, structure, or characteristic described in connection with the embodiment is included in at least one embodiment of the disclosure. It does not mean that the particular feature, structure, or characteristic is required in all embodiments of this disclosure.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The terms "forward" and "aft" refer to relative positions within a gas turbine engine or vehicle and are based on a normal operational attitude of the gas turbine engine or vehicle. More particularly, forward and aft are used herein with reference to a direction of travel of the vehicle and a direction of propulsive thrust of the gas turbine engine. The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Blade" can refer to a stationary or rotating blade. "Stationary blade(s)" has the same meaning as "vane(s)".

"Unducted aircraft engine" as used herein means an aircraft engine characterized by an array of rotating fan blades and static (or non-rotating) outlet guide vanes aft of the array of rotating fan blades, or an array of rotating fan blades and static, unducted inlet guide vanes forward of the rotating fan blades, or an array of counter-rotating fan blades aft of the rotating fan blades. In either case, neither the fan blades nor the inlet guide vanes or outlet guide vanes is surrounded by a duct or fan nacelle. On the other hand, "ducted aircraft engine" means an aircraft engine in which fan blades, inlet guide vanes, and/or outlet guide vanes are surrounded by a duct or fan nacelle.

During a flight mission, an aircraft typically goes through a takeoff phase, a climb phase, a cruise phase, a descend phase, an approach phase, and a landing phase.

"Takeoff" (TO) refers to the phase of a flight where the aircraft transitions from being stationary on the ground, to becoming airborne, and ends with a reduction of throttle to enter the climb phase, which occurs at between 10-20% of cruising altitude. During takeoff, the engine operates at or near maximum thrust to generate the necessary speed and lift in a takeoff mode.

"Climb" refers to the phase of a flight following takeoff where the aircraft ascends to a specified cruising altitude. During the climb phase, the engine continues to operate at higher thrust, though typically less than the maximum takeoff thrust. The climb phase is characterized by a rate of climb exceeding 500, 1000, or 1500 feet per minute (fpm). In some embodiments, the rate of climb during the climb phase is between 2500 to 3500 fpm.

"Cruise" or "cruise flight" refers to a phase of flight in which an aircraft levels in altitude ("cruise altitude") after the climb phase and prior to the descend phase. An aircraft engine operates in a cruise mode during the cruise phase, which is generally at a cruise speed that is from 50% to 95% of a rated speed, such as from 70% to 80% of the rated speed. In most flight envelopes, the cruise operating mode is exemplified by the operating mode of the gas turbine engine at a midpoint of the particular flight envelope based on a total fuel burn for the flight envelope (i.e., when the gas turbine engine has burned 50% of the total fuel burn for that gas turbine engine during the flight operation). During cruise, operating conditions are between 50% to 100% of the engine's maximum effective altitude where the aircraft rate of climb or rate of descent is less than +/−500 feet per minute.

In various examples, cruise flight takes place at a cruise altitude up to approximately 65,000 feet (ft.). In certain examples, cruise altitude is between approximately 28,000 ft. and approximately 45,000 ft. In yet other examples, cruise altitude is expressed in flight levels (FL) based on a standard air pressure at sea level, in which cruise flight is between FL280 and FL650. In another example, cruise flight is between FL280 and FL450. In still other examples, cruise altitude is defined based at least on a barometric pressure, in which cruise altitude is between approximately 4.85 pounds per square inch absolute (psia) and approximately 0.82 psia based on a sea-level pressure of approximately 14.70 psia and sea-level temperature at approximately 59 degrees Fahrenheit. In another example, cruise altitude is between approximately 4.85 psia and approximately 2.14 psia. It should be appreciated that, in certain examples, the ranges of cruise altitudes defined by pressure is adjusted based on a different reference sea-level pressure and/or sea-level temperature.

"Fan pressure ratio" refers to a ratio of an air total pressure immediately downstream of the fan blades during operation of the fan to an air total pressure immediately upstream of the fan blades of the fan during operation of the fan.

References to "noise", "noise level", or "perceived noise", or variations thereof, are understood to include sound pressure levels (SPL) outside a fuselage, fuselage exterior noise levels, perceived noise levels, effective perceived noise levels (EPNL), instantaneous perceived noise levels (PNL(k)), or tone-corrected perceived noise levels (PNLT(k)), or one or more duration correction factors, tone correction factors, or other applicable factors, as defined by the Federal Aviation Administration (FAA), the European Union Aviation Safety Agency (EASA), the International Civil Aviation Organization (ICAO), Swiss Federal Office of Civil Aviation (FOCA), or committees thereof, or other equivalent regulatory or governing bodies. Where certain ranges of noise levels (e.g., in decibels, or dB) are provided herein, it will be appreciated that one skilled in the art will understand methods for measuring and ascertaining of such levels without ambiguity or undue experimentation. Methods for measuring and ascertaining one or more noise levels as provided herein by one skilled in the art, with reasonable certainty and without undue experimentation, include, but are not limited to, understanding of measurement systems, frames of reference (including, but not limited to, distances, positions, angles, etc.) between the engine and/or aircraft relative to the measurement system or other perceiving body, or atmospheric conditions (including, but not limited to, temperature, humidity, dew point, wind velocity and vector, and points of reference for measurement thereof), as defined by the FAA, EASA, ICAO, FOCA, or other regulatory or governing bodies.

The rotation of airfoils in gas turbine engines creates airflow through the inlet of the compressor section of the turbomachine and channels an airflow downstream to generate thrust. As a result, a wake flow is generated and channeled downstream where it impinges against an object downstream from the airfoils, such as, for example, downstream outlet guide vanes. Depending on the object, wake flow impingement generates noise and/or aeromechanical loading. In some known engines, noise is generated, for example, by either the upstream rotating airfoil wake impinging on a stator or rotor component downstream from the rotating airfoil, or the upstream stator component wake impinging on a rotating airfoil downstream from the stator component.

The generation of such wake flow results in a loss of engine performance and engine efficiency. Reduction of the amplitude of the wake flow reduces the noise and the aeromechanical loading generated when the wake impinges against a downstream object. At least some known methods of reducing the amplitude of the wake flow include increasing the distance between the upstream airfoil and the downstream object. This increased distance mixes the wake flow and thus reduces the amplitude of the wake flow. Increasing the distance between an upstream airfoil and a downstream object increases the size, weight, and cost of the engine, and thereby reduces the efficiency and performance of the engine.

Different approaches have been studied to achieve noise reduction, such as designing airfoils for wake interaction noise reduction by corrugating the shape of the wake. As used herein, "corrugating" generally refers to causing changes to air flow resulting in large scale deformations of the wake. However, there are associated disadvantages with such an approach, as wake interaction noise reduction via corrugation is relevant for lightly loaded rotors and/or close rotor-stator spacing. Corrugating the wake, however, results in increased noise for certain airfoils and engines, such as, for example, highly loaded rotors and/or larger rotor-stator spacings. As addressed further below, this disclosure teaches how to design airfoils and sculpted trailing edge features, including chord amplitude, wavelength, and camber distribution, in view of certain engine parameters, such as fan pressure ratio, power coefficient, and thrust coefficient, to achieve noise reduction.

The inventors have sought to improve upon airfoil designs to maintain aerodynamic efficiency and reduce noise (as compared to previous designs). The inventors, in consideration of several different airfoil designs and engine architectures, considered how the geometry and dimensions of the airfoil would need to change to reduce acoustic emissions without structurally modifying it so drastically as to inhibit its aerodynamic performance at both low flight speeds (e.g., takeoff conditions) and high flight speeds (e.g., cruise conditions). The inventors developed multiple airfoil designs and then determined how sculpted trailing edge features affect aerodynamic efficiency and acoustic emissions.

The determination of how to design airfoils and sculpted trailing edge features for achieving a desired noise reduction and efficiency involved a time-consuming, iterative process. As explained in greater detail below, after evaluation of numerous airfoil and sculpted trailing edge features designs, the inventors found, unexpectedly, that there exists certain relationships between an amplitude of the sculpted trailing edge features, and in particular, a chordwise amplitude along with a spanwise wavelength of the sculpted trailing edge features, and other parameters (power coefficient, fan pressure ratio, and thrust coefficient), to achieve high aerodynamic performance and low noise. Utilizing these relationships, the inventors developed designs for sculpted trailing edge features in the form of wave-shaped projections to achieve high aerodynamic performance and low noise emissions (as compared to the absence of such features) at a given aerodynamic loading level. The wave-shaped projections are generally spaced apart from one another to form a waveform along at least a portion of the trailing edge.

The present disclosure illustrates approaches for developing sculpted trailing edge features that reduce the noise resulting from airfoil assemblies. This disclosure describes an approach of designing a sculpted trailing edge feature on an airfoil, such as, for example, a fan blade. This sculpted trailing edge feature enhances mixing of the wake of the airfoil before the wake impinges on downstream structures such as, for example, downstream outlet guide vanes. Ordinarily, this impingement of the wake results in noise. By enhancing the mixing of the wake with a sculpted trailing edge feature, the velocity deficit in the wake is reduced, thereby resulting in reduced noise.

Referring now to the drawings, FIG. 1 provides a schematic cross-sectional view of a turbine engine 10, which may be a gas turbine engine, and which utilizes airfoils and airfoil assemblies, in accordance with some embodiments of the present disclosure. As shown in FIG. 1, in this form, the turbine engine 10 defines an axial direction L (extending parallel to a longitudinal or axial centerline 12 provided for reference) and a radial direction R. A circumferential direction C extends three hundred sixty degrees (360°) around the axial centerline 12.

In one form, the turbine engine 10 includes a fan section 14 and a core turbine engine or engine core 16 disposed downstream of the fan section 14. The engine core 16 depicted generally includes a substantially tubular outer casing 18 that defines an annular core inlet 20. In some forms, the outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and an exhaust nozzle section 32.

In one form, a high pressure (HP) shaft or spool 34 drivingly connects the HP turbine 28 to the HP compressor 24. In some forms, a low pressure (LP) shaft or spool 36 drivingly connects the LP turbine 30 to the LP compressor 22. In other embodiments of turbine engine 10, additional spools are provided.

In one form, the fan section 14 includes a fan 38 having a plurality of airfoils, e.g., fan blades 40, coupled to a disk 42 in a spaced apart manner. As depicted, fan blades 40 extend outward from disk 42 generally along the radial direction R. In some forms, the fan blades 40 and disk 42 are together rotatable about the centerline axis 12 by the LP shaft 36. In some embodiments, a power gear box having a plurality of gears can be included for stepping down the rotational speed of the LP shaft 36 to a more efficient rotational fan speed.

In one form, referring still to the illustrated embodiment of FIG. 1, disk 42 is covered by a rotatable spinner 48. The rotatable spinner 48 is aerodynamically contoured to promote an airflow through the plurality of fan blades 40. Rotation of these airfoils, e.g., fan blades 40, generates a wake flow that impinges against downstream objects, resulting in noise. As addressed below, the fan blades 40 include sculpted trailing edge features that reduce this noise.

In one form, as shown in the depicted embodiment of FIG. 1, the fan 38 is a ducted fan 38. More specifically, the fan section 14 includes an annular fan casing or nacelle 50 that circumferentially surrounds the fan 38 and/or at least a portion of the engine core 16. In such a manner, the turbine engine 10 is referred to as a ducted turbine engine. However, in other embodiments, the turbine engine 10 is an unducted engine in which the fan section 14 is devoid of an annular fan casing or outer nacelle surrounding the fan 38.

In one form, the nacelle 50 is supported relative to the engine core 16 by a plurality of circumferentially-spaced outlet guide vanes 52. Moreover, a downstream section 54 of the nacelle 50 extends over an outer portion of the engine core 16 so as to define a bypass airflow passage 56 therebetween as shown in FIG. 1.

During operation of the turbine engine 10, a volume of air 58 enters turbine engine 10 through an associated inlet 60 of the nacelle 50 and/or fan section 14. A first portion of the air 58 (as indicated by arrows 62) is directed or routed into the bypass airflow passage 56, and a second portion of the air 58 (as indicated by arrows 64) is directed or routed into the LP compressor 22. The ratio between the first portion of air 62 and the second portion of air 64 is commonly known as a bypass ratio. The pressure of the second portion of air 64 is increased as it is routed through the high pressure (HP) compressor 24 and into the combustion section 26, where it is mixed with fuel and burned to provide combustion gases 66.

In one form, the combustion gases 66 are routed through the HP turbine 28. In the HP turbine 28, a portion of thermal and/or kinetic energy from the combustion gases 66 is extracted via passage through sequential stages of HP turbine stator vanes 68 and HP turbine rotor blades 70 that is coupled to the HP shaft or spool 34. The energy that is extracted causes the HP shaft or spool 34 to rotate and supports operation of the HP compressor 24.

In one form, the combustion gases 66 are then routed through the LP turbine 30. In the LP turbine 30, a second portion of thermal and kinetic energy is extracted from the combustion gases 66 via passage through sequential stages of LP turbine stator vanes 72 and LP turbine rotor blades 74 that is coupled to the LP shaft or spool 36. The energy that is extracted causes the LP shaft or spool 36 to rotate and supports operation of the LP compressor 22 and/or rotation of the fan 38.

In one form, the combustion gases 66 are subsequently routed through the exhaust nozzle section 32 of the engine core 16 to provide propulsive thrust. The HP turbine 28, the LP turbine 30, and the exhaust nozzle section 32 at least partially defines a hot gas path 78 for routing the combustion gases 66 through the engine core 16. Simultaneously, the pressure of the first portion of air 62 is also substantially increased and also provides propulsive thrust. The pressure of the first portion of air 62 is increased as it is routed through the bypass airflow passage 56 before it is exhausted from a fan nozzle exhaust section 76 of the turbine engine 10.

It should be appreciated that the turbine engine 10 depicted in FIG. 1 is by way of example only. In other embodiments, the turbine engine 10 has other suitable configurations. For example, in other embodiments, the turbine engine 10 includes additional components and/or may exclude depicted components. Further, although a turbine engine has been described above, it should be apparent to those skilled in the art that, with appropriate modification, the apparatus and methods described herein can be suitable for any device including airfoils (such as, for example, fan blades 40) that generate wakes downstream from the airfoil.

Figure 2:
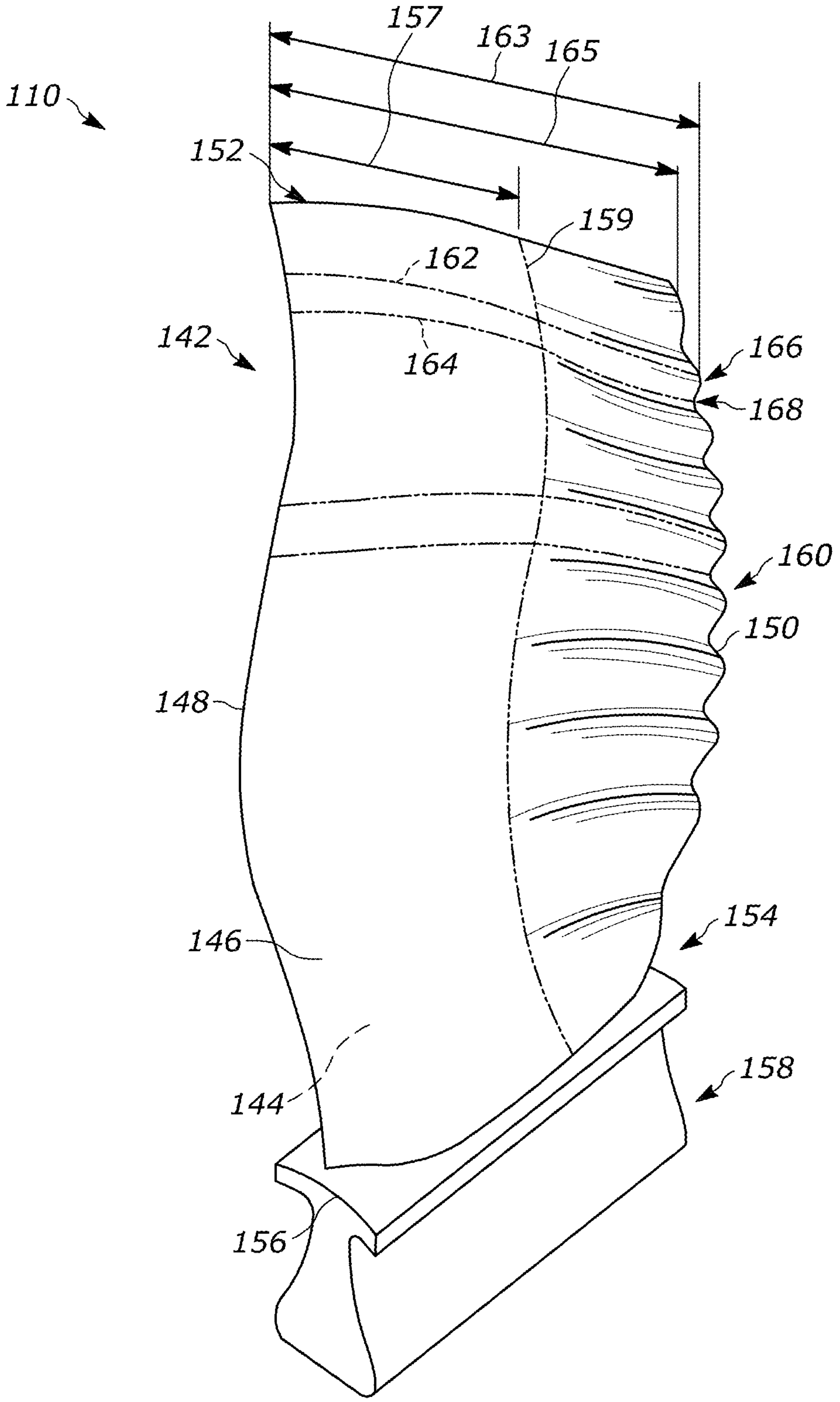
FIG. 2 is a perspective view of an airfoil in accordance with various embodiments.

Referring now to FIG. 2, a perspective view of an airfoil 110 is shown in accordance with various embodiments. The illustrated airfoil 110 is configured for use in the fan of the turbine engine 10 as depicted in FIG. 1. For example, in some embodiments, the airfoil 110 is used as the fan blade 40 of the turbine engine 10 depicted in FIG. 1. Alternatively, the airfoil 110 may be used as, but not limited to, a rotor blade or a stator blade.

In one form, the airfoil 110 includes an airfoil portion 142, a platform 156, and a root portion 154. In the illustrated embodiment, root portion 154 includes an integral dovetail 158 that enables the airfoil 110, e.g., fan blade, to be mounted, such as to rotor disk 42 (in FIG. 1). Airfoil portion 142 includes a first surface defining a pressure side 144 opposite a second surface defining a suction side 146. The pressure side 144 and the suction side 146 are coupled together at a leading edge 148 and at an axially-spaced trailing edge 150. Trailing edge 150 is spaced chordwise and downstream from leading edge 148. Pressure and suction sides 144 and 146, respectively, each extend longitudinally, or radially outward, from root portion 154 to tip portion 152.

As described in more detail below, in the illustrated embodiment, the airfoil 110 also includes a camber and thickness variation initiation line 159 extending in a spanwise direction from root portion 154 to tip portion 152. Initiation line 159 is spaced a chordwise distance 157 from the leading edge 148. In one embodiment, the distance 157 is between about 0% of a chord length 163 to about 90% of chord length 163. In the illustrated embodiment, distance 157 is about 60% of chord length 163. Alternatively, the airfoil 110 may have any conventional form, with or without dovetail 158 or platform 156. For example, airfoil 110 may be formed integrally with disk 42 in a blisk-type configuration that does not include dovetail 158 and platform 156.

In the illustrated embodiment, airfoil portion 142 includes a plurality of first chord sections 162 and a plurality of second chord sections 164. First chord sections 162 and second chord sections 164 extend generally chordwise between leading and trailing edges 148 and 150, respectively. As described in more detail below, each first chord section 162 is radially spaced a distance away from an immediately adjacent second chord section 164. In the depicted embodiment, the first chord sections 162 define or are formed with at least one first chord length 163, and the second chord sections 164 define or are formed with at least one second chord length 165. In some forms, at least one chord section of the plurality of first chord sections 162 extends outward from the pressure side 144 at the trailing edge 150, and at least one chord section of the plurality of second chord sections 164 extends outward from the airfoil suction side 146 at the trailing edge 150.

In the illustrated embodiment, at least one first chord section 162 is formed with a chord length 163 that is longer than the at least one second chord length 165 of at least one second chord section 164. More specifically, the first chord section 162 defines a wave peak 166 along the trailing edge 150, and the second chord section 164 defines a wave trough 168 along the trailing edge 150. In this manner, the plurality of alternating first chord sections 162 and second chord sections 164 define a wave-like pattern, thereby defining a plurality of wave-shaped projections 160 extending along the trailing edge 150. In this regard, as used herein, "extending along the trailing edge" generally means defining at least a portion of the trailing edge. For example, in some forms, the plurality of wave-shaped projections 160 may extend along the entire trailing edge 150, while in other forms, it may extend over a portion of the trailing edge 150.

Figure 3:
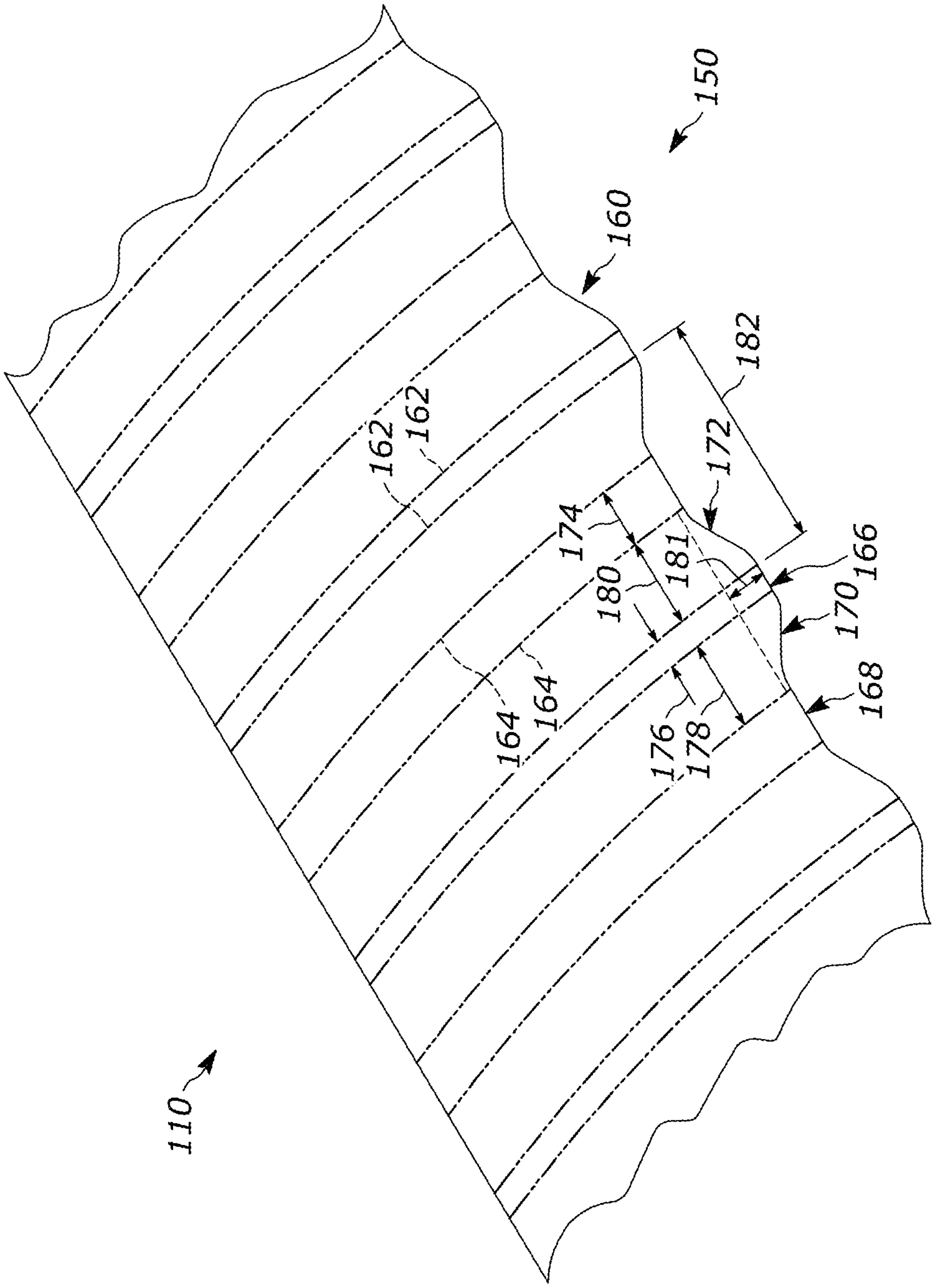
FIG. 3 is a perspective view of a portion of the airfoil of FIG. 2.

As shown in FIG. 3, in one form, the plurality of wave-shaped projections 160 each include a radially inner edge 170 and a radially outer edge 172. The trailing edge 150 is defined by a plurality of tip portions, such as a wave peak 166, and by a plurality of trough portions, such as a wave trough 168. For example, each plurality of wave-shaped projections 160 defines a wave peak 166 or a wave trough 168. For example, each wave peak 166 is defined on a respective first chord section 162, and each wave trough 168 is defined on a respective second chord section 164. As a result, each wave peak 166 extends, in a chordwise direction, a trough distance 181 downstream from each wave trough 168. Moreover, each inner edge 170 and outer edge 172 extends generally radially between a portion of the wave peak 166 and the wave trough 168. The wave-shaped projections 160 are each characterized by an amplitude that is half of the peak-to-trough distance. The wave-shaped projections 160 are each characterized by an average local chord length that is an average value of chord lengths of each wave-shaped projection 160 with a chord length being the distance from the leading edge to the trailing edge at a point in a streamwise direction. The streamwise direction is the direction of airflow as it moves over and past the airfoil 110, specifically from the leading edge to the trailing edge of the airfoil 110.

In the illustrated embodiment, the number of alternating adjacent first and second chord sections 162 and 164 determines the number of wave-shaped projections 160 defined along trailing edge 150. Specifically, the second chord section 164 is separated by a distance 178 from each first chord section 162, measured with respect to radially inner edge 170. Similarly, each first chord section 162 is separated by a distance 180 from each second chord section 164 measured with respect to radially outer edge 172. Alternatively, in some forms, distances 178 and 180 are substantially zero such that inner and outer edges 170 and 172 extend substantially chordwise between a portion of the wave peak 166 and wave trough 168.

In the depicted embodiment, wave-shaped projections 160 are substantially symmetrical, such that distances 178 and 180 are approximately equal. As a result, a slope of inner edge 170, with respect to platform 156, is substantially inverted relative to a slope of outer edge 172. In an alternative embodiment, distance 178 is not equal to distance 180, resulting in wave-shaped projections 160 that are substantially asymmetrical. In such an embodiment, the slope of inner edge 170 is not mirror symmetric to the slope of outer edge 172. In another embodiment, inner edge 170 and outer edge 172 have a plan shape that extends between wave peak 166 and wave trough 168 including, but not limited to, a straight edge, a sinusoidal edge, and a saw-tooth edge.

In some embodiments, the wave-shaped projections 160 are integrally formed with the airfoil 110. The wave-shaped projections 160 are formed through manufacturing techniques including, but not limited to, additive manufacturing and/or subtractive manufacturing. Alternatively, the wave-shaped projections 160 are manufactured using a multi-part construction approach.

In some forms, the plurality of wave-shaped projections 160 extend in a spanwise direction along most or all of the trailing edge from root portion 154 to tip portion 152 of the airfoil 110. Alternatively, in some forms, the plurality of wave-shaped projections do not extend along the entire trailing edge. In some forms, the wave-shaped projections extend along a portion of the trailing edge of the airfoil 110, as described below with respect to FIGS. 6B and 6C.

As shown in FIG. 3, in one form, the wave trough 168 has a length 174 that extends generally along the trailing edge 150, and the wave peak 166 has a length 176 that extends generally along the trailing edge 150. Alternatively, the length 174 of the wave trough 168 is substantially zero such that wave trough 168 is substantially a transition point defined between inner and outer edges 170 and 172, and/or the length 176 is substantially zero such that the wave peak 166 is substantially a transition point defined between inner and outer edges 170 and 172.

In some forms, the plurality of wave-shaped projections 160 is fabricated according to a pre-determined aspect ratio that represents a ratio of the peak-to-trough distance 181 with respect to a peak-to-peak distance 182. The peak-to-trough distance 181 is the distance between wave peak 166 and wave trough 168 of adjacent wave-shaped projections 160. The peak-to-peak distance 182 is the spanwise distance between the adjacent wave-shaped projections 160. The peak-to-trough distance 181 is within a range of values representative of a percentage of the first chord length 163, such as about 10% of the first chord length 163. For example, the peak-to-trough distance 181 is between about 0% to about 50% of the first chord length 163. As addressed in more detail below, a preferred range for interaction noise reduction is generally in the range of about 0.5%-7%.

Figure 4:
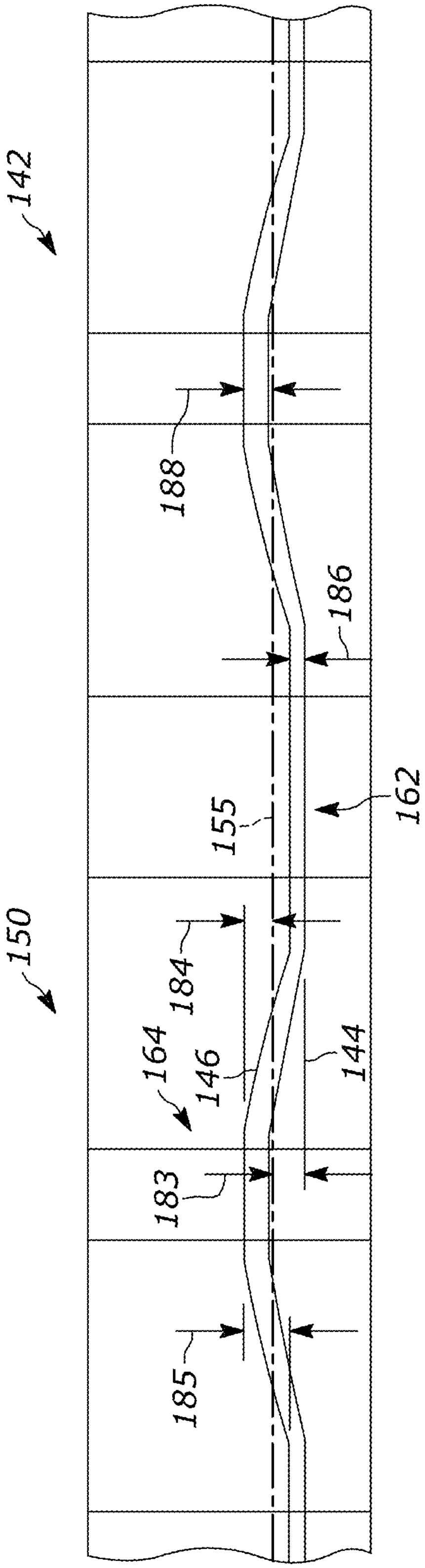
FIG. 4 is a cross-sectional end view of a portion of the airfoil of FIG. 2.

Referring to FIG. 4, a cross-sectional end view of the airfoil 110 of FIG. 2 is provided in accordance with various embodiments. In one form, the airfoil 110 includes a mean line or mean camber line 155 extending in a chordwise direction from the leading edge 148 to the trailing edge 150 (e.g., as shown in FIG. 2) and equidistant from both the pressure side 144 and the suction side 146. The mean camber line 155 represents a locus of points lying halfway between the pressure side 144 and the suction side 146.

In one form, the airfoil 110 has a thickness which is a distance measured normal to the mean camber line 155 between the pressure side 144 and the suction side 146 at any location along the mean camber line 155. More specifically, the airfoil 110 has a first chord thickness 186 defined on at least one first chord section 162 and has a second chord thickness 188 defined on at least one second chord section 164. In some forms, the first chord thickness 186 is substantially equal to the second chord thickness 188 from the leading edge 148 to initiation line 159. Additionally, or alternatively, as shown in FIG. 4, the first chord thickness 186 is thinner than the second chord thickness 188 from the initiation line 159 to about the trailing edge 150 to form the plurality of wave-shaped projections 160, thereby defining a crenulated airfoil 110. In other forms, it is desirable for the first chord thickness 186 to be thicker than the second chord thickness 188 so as to have a well-defined chord extension.

Figure 5:
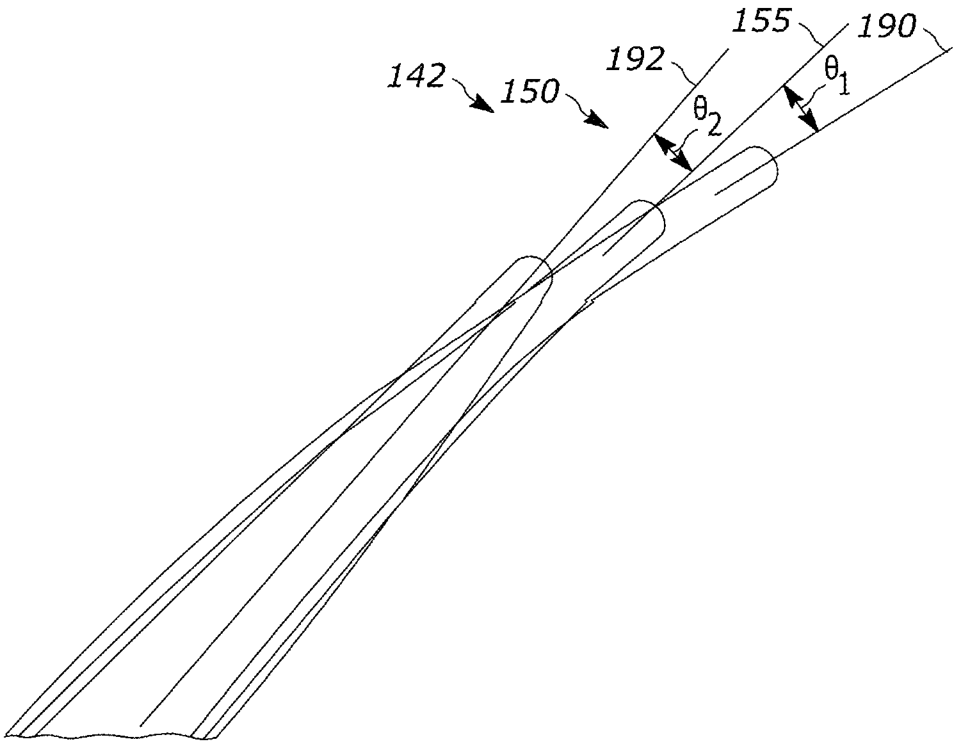
FIG. 5 is a cross-sectional view of a portion of the airfoil of FIG. 2.

Referring to FIG. 5, a cross-sectional view of a portion of the airfoil 110 is shown in accordance with various embodiments. In one form, the airfoil 110 includes first chord sections 162 and second chord sections 164 formed with respective camber lines 190 and 192. The first chord camber line 190 is oriented an angle $\theta_1$ at trailing edge 150 with respect to the airfoil mean camber line 155. More specifically, the orientation of first chord camber line 90 causes the wave peak 166 to extend a distance 183 into a flow path (not shown) of the pressure side 144 of the airfoil 110, wherein the distance 183 is measured between the mean camber line 155 and the pressure side 144. Similarly, the second chord camber line 192 is oriented at an angle $\theta_2$ with respect to the mean camber line 155. More specifically, the orientation of second chord camber line 192 causes the wave trough 168 to extend a distance 184 into a flow path (not shown) of the suction side 46 of the airfoil 110, wherein the distance 184 is measured between the mean camber line 155 and the suction side 146.

As shown in FIG. 4, a distance 185 is measured between the suction side 146 of the wave peak 166 and the suction side 146 of the wave trough 168. Moreover, in the illustrated embodiment, distance 185 defined on trailing edge 150 is further increased by increasing the angular distance at trailing edge 150 between second chord camber line 192 and first chord camber line 190. Increasing the distance 185 can facilitate mixing the wake generated by the airfoil 110, thereby reducing noise and aeromechanical loading on a downstream object. As used herein, and as addressed further below, the term "wake-mixing" or forms thereof, generally refers to a generation of vortices in the airflow as it moves past the airfoil which serve to accelerate wake mixing to reduce interaction noise.

In some embodiments, the number of the wave-shaped projections 160 defined on trailing edge 150 is proportionate to the number of vortices generated downstream from airfoil 110. During operation, airflow is channeled past the suction side 146, the pressure side 144, and the wave-shaped projections 160 over the airfoil 110. The wave-shaped projections 160 generate a counter-rotating vortex pair (not shown) as airflow is channeled over them. In some forms, the airflow channeled past each radially inner edge 170 generates a first vortex, and the airflow channeled over each radially outer edge 172 generates a counter-rotating second vortex. As a result, in some embodiments, the wave-shaped projections 160 generate a pair of counter-rotating vortices extending downstream from trailing edge 150. The size, shape, orientation, and slope of the radially inner and outer edge 170 and 172 affects the size of vortices generated. For example, as the slope of radially inner or outer edges 170 or 172 is increased (e.g., steeper), or the distance 178 or 180 is decreased, the resulting size of the generated vortex is decreased (e.g., smaller).

In some embodiments, during engine operation, a plurality of airfoils, such as fan blades 40 shown in FIG. 1, rotate about centerline axis 12 such that the airflow is channeled in a downstream direction. The airflow is channeled over and impinges on the wave-shaped projections 160 to mix the fan wakes before impinging on a downstream component, such as a downstream outlet guide vane, which can reduce unsteady loading and acoustic emissions (e.g., noise).

Figure 6C:
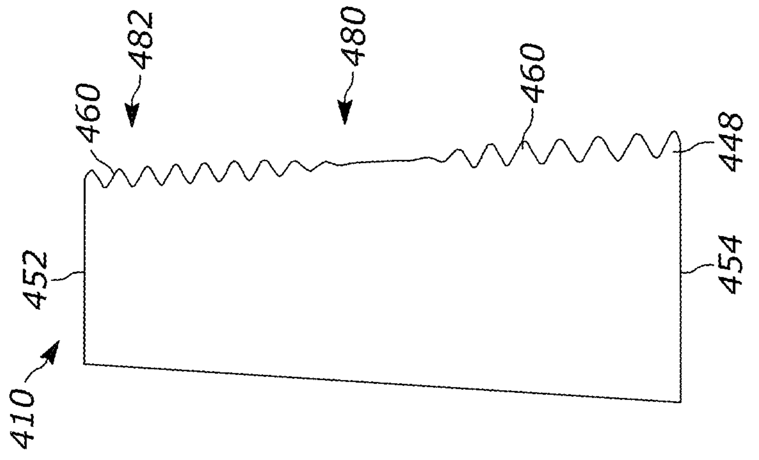
FIG. 6C is a plan view of an airfoil with wave-shaped projections extending along the ends of the trailing edge.
Figure 6B:
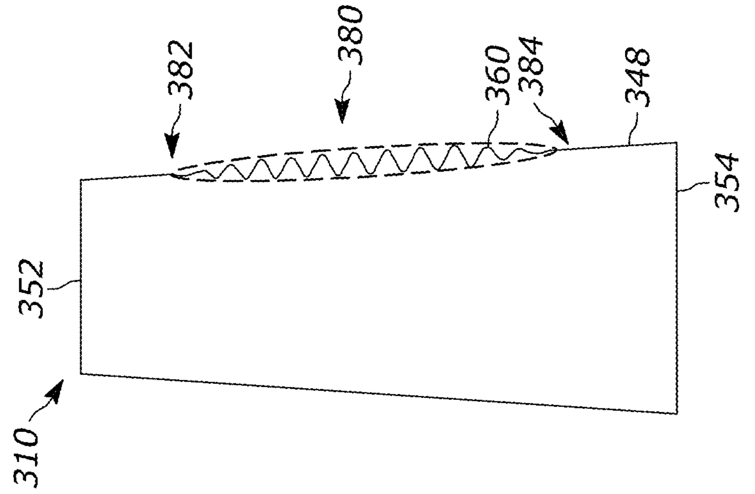
FIG. 6B is a plan view of an airfoil with wave-shaped projections extending along the middle of the trailing edge.
Figure 6A:
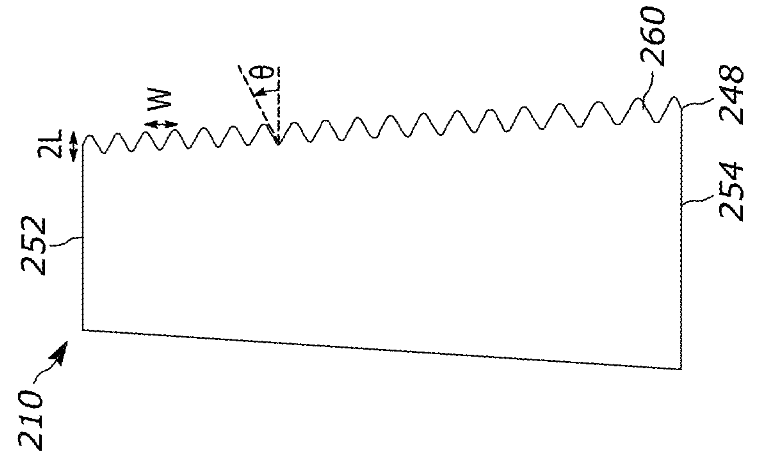
FIG. 6A is a plan view of an airfoil with wave-shaped projections extending along the entire trailing edge.

Referring to FIGS. 6A-6C, plan views of examples of airfoils 210, 310, 410 are shown in accordance with various embodiments. In some forms, the airfoils 210, 310, 410 are generally the same or similar to the airfoil 110 described above with respect to FIGS. 2-5. As addressed below, certain other features of the airfoil may be modified to reduce downstream noise, including, for example, the aspect ratio of the sculpted trailing edge and tapering of the wave-shaped projections.

With respect to FIG. 6A, the airfoil 210 includes a plurality of wave-shaped projections 260 extending along the trailing edge 248. The plurality of wave-shaped projections 260 are formed along a substantial portion (e.g., the entire length) of the airfoil 210. In other words, in this example, the wave-shaped projections 260 extend the entire length, or substantially the entire length, between the tip 252 and the root 254 in a spanwise direction.

In one form, the plurality of wave-shaped projections 260 is fabricated according to a certain aspect ratio. The aspect ratio (AR) represents a ratio of the peak-to-peak distance (W) to a peak-to-trough distance (or twice the amplitude (2L)). As can be seen in FIG. 6A, in this form, each wave-shaped projection 260 also defines a mean side angle (θ) in the streamwise direction.

Depending on loading and distance to downstream objects (e.g., outlet guide vane), the wake mixing characteristics of the airfoil 210 can be refined based on the aspect ratio of the wave-shaped projections 260. For example, a higher aspect ratio spaces the mixing vortices further apart, allowing for longer downstream mixing distances before merging and ceasing to mix the wakes, while a density of vortices is lowered. In one form, in order to reduce noise, it has been found that the relationship of aspect ratio (AR=W/2L) to mean side angle is such that $\theta>26.6°$ and AR>1.0, where θ is the mean side angle defined as $$\tan\theta = \frac{W/2}{2L}.$$

Otherwise in this form, for $\theta\leq 26.6°$ and $W\leq 2L$, the side edge angles result in waves having a relatively steep shape, and it has been found that these steep wave features do not significantly reduce interaction noise in which blade wakes impinge on downstream surfaces.

In one aspect, the inventors found that shallower wave-shaped projections increase spacing between mixing vortices and change mixing characteristics (e.g., downstream distance between vortex merging) to effectively reduce noise emission while maintaining favorable aerodynamic performance. Noise reduction over 0.25 dB, 0.50 dB, or 1 dB is deemed significant, depending on various factors such as, for example, the nature of the engine, loading, noise that may be generated by other components, and/or regulatory or governmental noise limits. Moreover, in one aspect, the inventors discovered that having a mean side angle θ greater than 26.6°, such as greater than 30.0°, greater than 45.0°, or greater than 50.0° effectively provides wave-shaped projections with wake mixing characteristics to reduce noise. In other words, the inventors found that increasing the mean side angle generally improved wake mixing characteristics to reduce noise starting at about 26.6° and further improved wake mixing characteristics to an observable degree at the higher angles depending on the base airfoil design.

Depending on the loading and the distance to downstream objects, wake mixing characteristics are refined by selecting a different aspect ratio for a given chordwise amplitude. A higher aspect ratio AR spaces the sculpted trailing edge mixing vortices further apart, allowing for longer downstream mixing distances before merging and ceasing to mix the wakes, at the expense of a lower density of vortices (potentially less accelerated mixing). In view of these factors, it is generally contemplated that a preferred range of mean side angle θ for noise reduction is between about 26.6° and 65.0°, although higher angles may be preferred in some instances. It has been found that designs with smaller angles do not generally provide interaction benefits resulting in noise reduction.

With respect to FIG. 6B, the airfoil 310 includes a plurality of wave-shaped projections 360 extending along the trailing edge 348. In this form, the plurality of wave-shaped projections 360 are formed in a midspan portion 380. In this form, the chordwise amplitude of the wave-shaped projections 360 generally tapers as one moves from the middle of the midspan portion 380 to either the first end 382 or the second end 384 of the midspan portion 380. The wave-shaped projections 360 are concentrated in the midspan region such that the midspan portion 380 provides more wake mixing benefits (as compared to the tip portion 352 and the root portion 354). In some embodiments, the wave-shaped projections 360 are tapered (e.g., gradually tapered) to prevent an otherwise discontinuous change between the midspan portion 380 and a remaining portion (e.g., tip portion 352 and root portion 354) of the airfoil 310 extending along the trailing edge 348 to prevent the mixing vortices from negatively impacting the wake mixing downstream of the trailing edge 348 of the airfoil 310.

With respect to FIG. 6C, the airfoil 410 includes a plurality of wave-shaped projections 460 extending along the trailing edge 448. In this form, the plurality of wave-shaped projections 460 are formed near the tip portion 452 (at 482) and near the root portion 454. In this form, the chordwise amplitude of the wave-shaped projections 460 generally tapers toward an intermediate span portion 480 away from either end to provide wake mixing features near the tip portion 452 and root portion 454 while avoiding potential challenges with implementing the features in a particularly sensitive region of the airfoil trailing edge. The wave-shaped projections near the tip portion 452 and root portion 454 are tapered toward the intermediate span portion 480 to prevent a discontinuous change between the tip and root portion 452, 454 and the intermediate span portion 480 to prevent the mixing vortices from negatively impacting the wake mixing downstream of the trailing edge.

As discussed above, determining the shape and sizing of sculpted trailing edge features is typically a labor and time-consuming process. It commonly includes an iterative design process that involves significant design iteration time to determine sizing of the sculpted trailing edge features based on airfoil camber and wave evolution, testing whether the sizing of the sculpted trailing edge features results in suitable engine performance (e.g., noise generation, aerodynamic loading), and modifying the shape and sizing of the sculpted trailing edge features in accordance with the testing.

The inventors discovered, unexpectedly during the course of improving engine design for various engine architectures, a relationship between certain airfoil features and certain engine design parameters where high aerodynamic performance and low noise is achieved. Utilizing these relationships, the inventors found designs for sculpted trailing edge features with wave-shaped projections that achieve high aerodynamic performance and low noise emissions at a given aerodynamic loading level. As addressed further below, it has been found that certain characteristics of airfoils 210, 310, 410, such as chordwise amplitude of the wave shaped projections (L) and the average local chord length (c) of the airfoil, may be adjusted or tuned with respect to certain engine design parameters, such as power coefficient, fan pressure ratio, and thrust coefficient, to reduce the downstream noise of the airfoil.

The inventors' approach involved a detailed analysis of how aerodynamic and geometric factors influence airfoil performance and acoustic emissions, and how to determine sizing of wave-shaped projections for a given loading level to provide effective aerodynamic and noise control. By one approach, the inventors performed computational fluid dynamics (CFD) analysis and considered multiple airfoil designs to determine a ratio of the amplitude to the chord length as a function of the power coefficient and the fan pressure ratio and certain ranges of threshold values to achieve good aerodynamic performance and low noise in operational conditions.

The inventors considered the relationship of L/c to other parameters, where L is the amplitude of the sculpted trailing edge feature and c is the average local chord length. This parameter L/c is a general indicator of the chordwise lengths of the wave-shaped projections relative to chord length of the airfoil. In one form, this parameter is compared to the power coefficient of an engine, $C_p$, during subsonic cruise operation of the engine. As addressed further below, in one aspect, it was determined that a relationship exists between L/c and $C_p$ that provides guidance for design of an airfoil with a sculpted trailing edge feature resulting in reduced noise characteristics.

Figure 7:
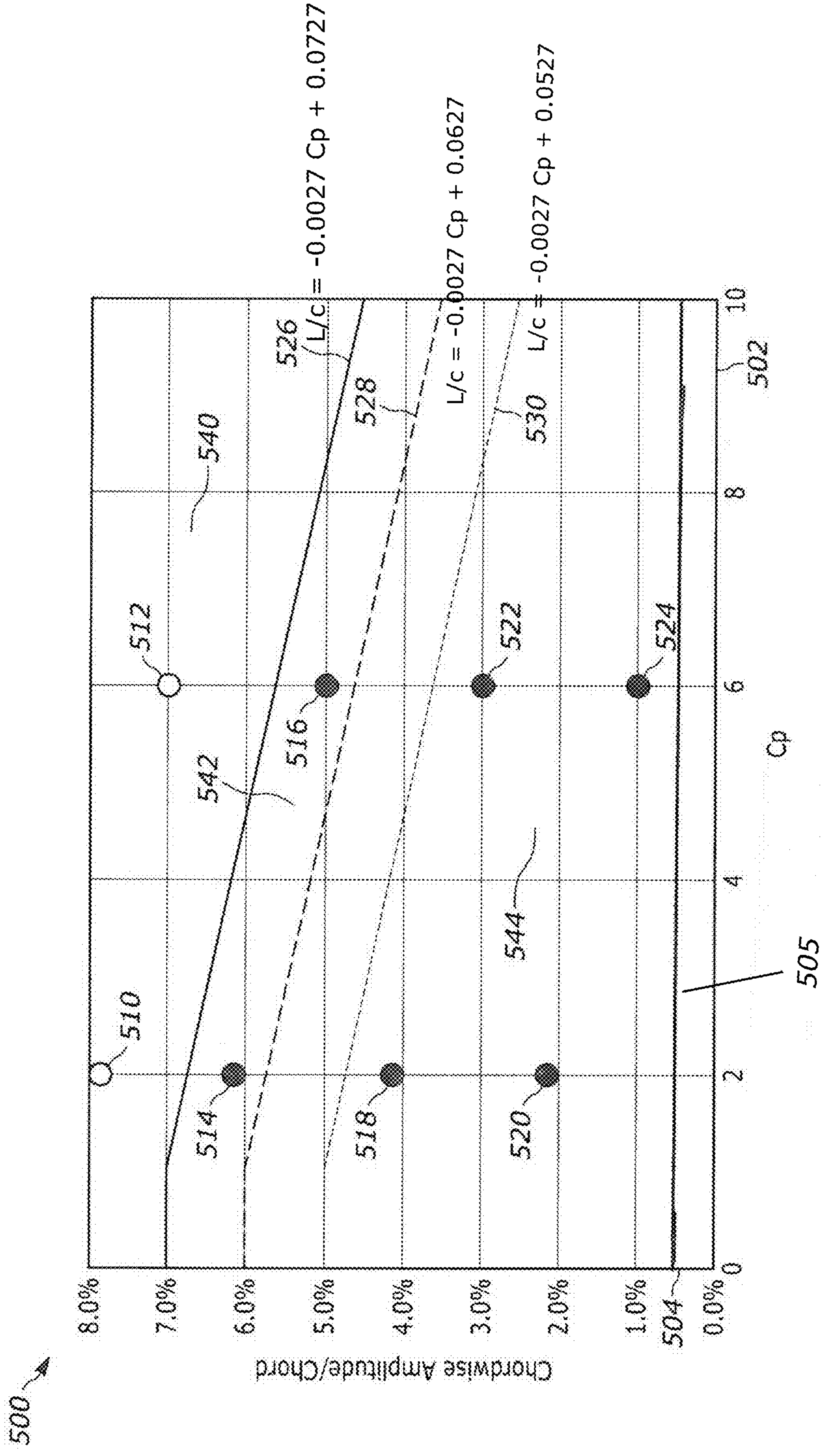
FIG. 7 is a graph showing data points corresponding to design parameters for airfoils involving chordwise amplitude of the wave-shaped projections of the airfoil, chord length of the airfoil, and power coefficient of a turbine engine.

Data points for spanwise amplitudes as a function of power coefficient at design conditions for several airfoils are plotted in a graph in FIG. 7 as graph 500. The graph 500 includes L/c values, which is the chordwise amplitude (L) divided by the chord on the y-axis 504, and the power coefficient at design conditions (e.g., subsonic cruise operation on the x-axis 502) for airfoils at data points 510-524. The graph 500 also includes a first line 526, a second line 528 offset from the first line 526 along the y-axis 504, and a third line 530 offset from the second line 528 along the y-axis 504. It was found that airfoils at the data points 510 and 512 above the lines do not show significant noise reduction. In contrast, the airfoils at the data points 514, 516, 518, 520, 522, and 524 below the first line 526 do show significant noise reduction. This noise reduction continues to a lesser degree until L/c approaches about 0.5% (or 0.005) at which point the wave-shaped projections become too small, as indicated by the minimum horizontal line for L/c at 0.5% in FIG. 7. FIG. 7 is addressed in more detail below. In this regard, it is contemplated that noise reduction over 0.25 dB, 0.50 dB, or 1 dB may be deemed significant, depending on various factors such as, for example, the nature of the engine, loading, noise that may be generated by other components, and/or regulatory or governmental noise limits.

In one aspect, it is generally contemplated that data points 510 and 512 correspond to airfoils with oversized, or overpowered, sculpted trailing edge features (or wave-shaped projections), which distort the wakes, add aerodynamic losses, and lead to noise penalties (or increased noise). Next, regarding data points 514 and 516 below first line 526, these data points correspond to airfoils with more intermediate sized and shaped sculpted trailing edge features that provide a significant mixing benefit before the crossover to an acoustic penalty. These data points are desirable for wake mixing for higher loading cases. Further, regarding data points 518, 520, 522, and 524, it is understood that mixing benefits continue as one moves below second and third lines 528 and 530. These data points correspond to airfoils with scaled down feature sizing when other considerations (e.g., performance at other operating conditions, mechanical/structural design considerations, etc.) may need to be accounted for causing one to reduce the amplitude of the sculpted trailing edge features.

Accordingly, in one aspect, using this design process, the inventors have discovered a relationship between the amplitude (L) of shaped apart wave-shaped projections, the average local chord length (c), and the power coefficient ($C_p$) according to the below relationship for an airfoil:

$$0.005 \leq L/c \leq -0.0027^{*}C_P + d_P, \text{ for } 0.0527 \leq d_p \leq 0.0727 \quad (1)$$

where amplitude (L) is half of a peak-to-trough distance of a wave-shaped projection, the average local chord length (c) is an average value of chord lengths of the wave-shaped projection with chord length being the distance from the leading edge to the trailing edge at a point in a streamwise direction, and $d_P$ is a constant selected within the above range. The ratio of amplitude (L) to average local chord length (c) is a non-dimensionalized amplitude of the wave-shaped projection.

The power coefficient ($C_p$) during subsonic cruise operation of an engine with airfoils, such as fan blades, is defined by:

$$C_p = P/(\rho n^3 D^3 A) \tag{2}$$

where n=revolutions/second of the airfoils, ρ=air density, A=annular area defined by each $$\text{airfoil} = \pi(r_{T(LE)}^2 - r_{H(LE)}^2)$$

where $r_T$ is a tip radius at the leading edge and $r_H$ is a hub radius at the leading edge of each airfoil, D=diameter at the leading edge of each airfoil, and P=power absorbed by the airfoils. The ratio L/c, power coefficient $C_p$, and $d_P$ are all non-dimensional variables/values, and consistent measurement units (such as metric measurements) may be used so as to result in non-dimensional values.

In one aspect, the inventors have determined that a ratio of amplitude (L) to average local chord length (c), e.g., L/c values, which are greater than 0.005 and less than $-0.0027{*}C_p+d_P$ for $0.0527 \le d_P \le 0.0727$ for a power coefficient ($C_p$) in a range between and including 1 to 10 would result in suitable geometry for the wave-shaped projections (e.g. sculpted trailing edge features) of the airfoil to effectively reduce noise while maintaining high aerodynamic performance. In some forms, an L/c value is greater than 0.005 and less than $-0.0027{*}C_p+d_P$ for $d_P \le 0.0627$, for a power coefficient ($C_p$) in a range between and including 1 to 10.

Alternatively, as addressed below and as can be seen from Table 1 below and FIG. 7, a constant parameter may be selected for $d_P$ in the above equation. The parameter $d_P$ may be replaced with a constant value selected from the set of 0.0727, 0.0627, and 0.0527. For example, for $d_P$=0.0727, the equation would be $0.005 \le L/c \le -0.0027{*}C_p+0.0727$; for $d_P$=0.0627, the equation would be $0.005 \le L/c \le -0.0027{*}C_p+0.0627$; and for $d_P$=0.0527, the equation would be $0.005 \le L/c \le -0.0027{*}C_p+0.0527$. Each of these equations represents a different coverage of design space, as shown in FIG. 7.

In some implementations, an L/c value is greater than 0.005 and less than 0.07 for a power coefficient ($C_p$) in a range from 0 to 1. In some forms, a $C_p$ of 0 corresponds to a stator. For low power coefficients, $C_p$, or low loading conditions between 0 and 1, it is desirable to maintain a constant, maximum L/c value of 0.07 (or 7%). The sizing of the wavelike projections above this maximum L/c value results in a noise penalty at these low $C_p$ values. Thus, the design space is defined in FIG. 7 between vertical lines at $C_p$=0 and $C_p$=10 and between a horizontal minimum line 505 for L/c at 0.5% (or 0.005) and a maximum line 526 (or an offset second line 528 or third line 530). In some implementations, it may be desirable to limit the design space to the region between any two of the lines 526, 528, and 530 in FIG. 7.

As indicated above, example spanwise amplitudes as a function of a power coefficient at design conditions of several airfoils are plotted in the graph in FIG. 7 as graph 500. The graph 500 includes L/c values on the y-axis 504 and the power coefficient, $C_p$, at design conditions (e.g., subsonic cruise operation) on the x-axis 502 for airfoils at data points 510-524. The graph 500 also includes a first line 526, a second line 528 offset from the first line 526 along the Y-axis 504, and a third line 530 offset from the second line 528 along the Y-axis 504. The first, second, and third lines 526, 528, 530 are defined by the "$-0.0027{*}C_p+d_P$" portion of the inequality (1). The offset between the lines is proportional to a value of "$d_P$" in the inequality (1). Particularly, the first line 526 has a "$d_P$" value of 0.0727, the second line 528 has a "d" value of 0.0627, and the third line 530 has a "$d_P$" value of 0.0527. In FIG. 7, for $C_p$ greater than or equal to 1, line 526 has an equation of L/c=−0.0027 $C_p$+0.0727; line 528 has an equation of L/c=−0.0027 $C_p$+0.0627; and line 530 has an equation of L/c=−0.0027 $C_p$+0.0527.

Table 1 below shows the data points 514-524 and corresponding values for variables L/c, $C_p$, and $d_P$. In these examples, the value of $d_P$ corresponds to the lines 526, 528, and 530 such that the data point is within the corresponding design space. Data points 514-524 fall within acceptable values for the variables (assuming the design space is below line 526).

TABLE 1

| Data Point | L/c | $C_p$ | $d_p$ |
|---|---|---|---|
| 514 | 6.1% | 2 | 0.0727 |
| 516 | 5.0% | 6 | 0.0727 |
| 518 | 4.1% | 2 | 0.0527, 0.0627, or 0.0727 |
| 520 | 2.1% | 2 | 0.0527, 0.0627, or 0.0727 |
| 522 | 3.0% | 6 | 0.0627, 0.0627, or 0.0727 |
| 524 | 1.0% | 6 | 0.0527, 0.0627, or 0.0727 |

Table 2 below shows the data points 510 and 512 and corresponding values for variables L/c, $C_p$, and $d_P$. In these examples, the value of $d_P$ to satisfy the equation L/c=−0.0027 $C_p$+d would exceed 0.0727. In these examples, as can be seen from the graph in FIG. 7, the data points 510 and 512 are above lines 526, 528, and 530 and fall outside of acceptable values for the variables.

TABLE 2

| Data Point | L/c | $C_p$ | $d_p$ |
|---|---|---|---|
| 510 | 7.9% | 2 | Exceeds 0.0727 |
| 512 | 7.0% | 6 | Exceeds 0.0727 |

In one form, airfoils at data points 510, 512 represent fan blades having a L/c value for a power coefficient within a design space 540 above line 526. Particularly, in this form, an airfoil at data point 510 has a L/c value at 7.9% for a power coefficient at design of 2, and an airfoil at data point 512 has a L/c value at 7.0% for a power coefficient at design of 6, which results in large wave-shaped projections.

In one form, airfoils at data points 514, 516 represent fan blades with intermediate L/c values for a power coefficient within a design space 542 between lines 526 and 528. In the airfoil at data point 514, the L/c value is 6.1% for a power coefficient at design of 2. In the airfoil at data point 516, the L/c value is at 5.0% for a power coefficient at design of 6. By one approach, the inventors determined that airfoils having intermediate L/c values within the design space 542 provide significant noise reduction relative to airfoils with L/c values within the design space 540.

In one form, the inventors further discovered lower L/c values for a power coefficient at design that take into consideration other factors associated with the airfoils (e.g., performance at other operating conditions, mechanical/structural design, etc.). In this form, significant noise reduction is achieved, without sacrificing efficiency, when the airfoil has a L/c value within a design space 544 below the second line 528 and/or third line 530. For example, airfoils at data points 518-524 represent fan blades with lower L/c values for a power coefficient that takes into consideration various factors, such as those indicated above.

Figure 8A:
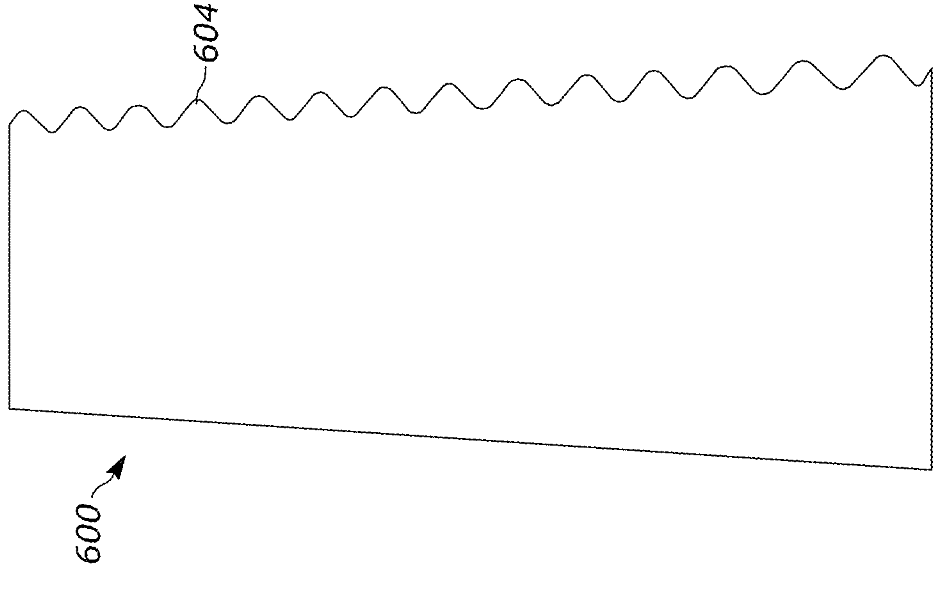
FIG. 8A is a plan view of an airfoil with wave-shaped projections extending along the trailing edge in accordance with various embodiments.
Figure 8B:
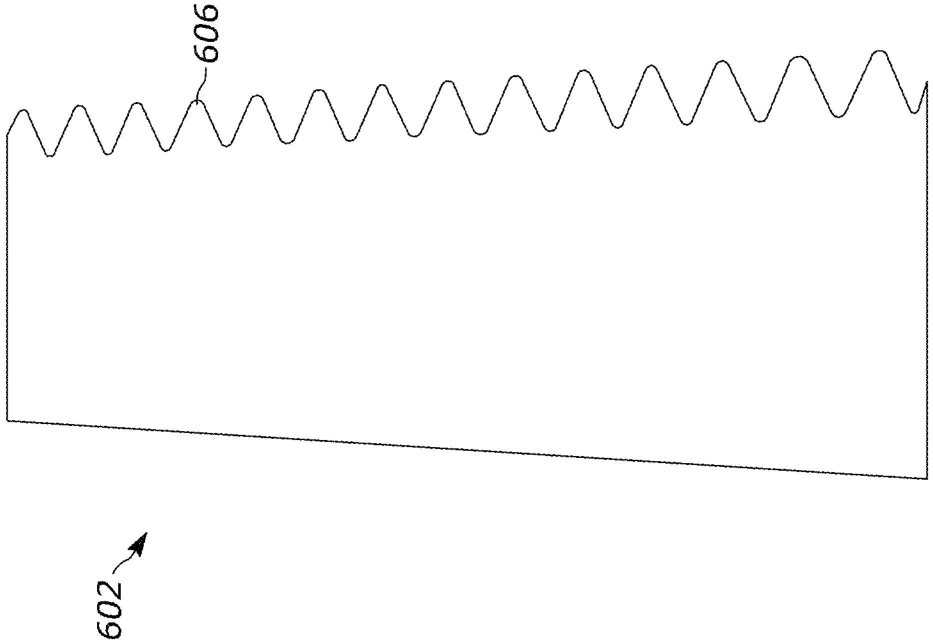
FIG. 8B is a plan view of an airfoil with wave-shaped projections extending along the trailing edge that result in an interaction noise penalty and not in accordance with various embodiments.

As an example, FIGS. 8A and 8B show a comparison of an airfoil 600 corresponding to a data point 518 that is within the design space and an airfoil 602 corresponding to a data point 510 outside of the design space. In this example, as can be seen, the airfoil 600 in the design space includes smaller wave-shaped projections 604 than the corresponding wave-shaped projections 606 that are outside of the design space. It has been found that the airfoil 600 generates wake mixing resulting in reduced noise, while in contrast, the airfoil 602 negatively impacts wake mixing downstream of the trailing edge of the airfoil 602 and does not provide noise reduction benefits.

Further, in some implementations, it is desirable to alter other aspects of the airfoil. For example, in some implementations, designing an airfoil with L/c values that vary (or are not constant) from the inner root to the outer tip of the airfoil would result in suitable airfoil geometry. Varying the L/c values in designing the airfoil may result in a tapered spanwise profile/envelope of the plurality of wave-shaped projections to prevent the mixing vortices from negatively impacting wake mixing downstream of the trailing edge of the airfoil, such as shown in FIGS. 6B and 6C. In other implementations, it is desirable to include a minimum number of waves of the wave-shaped projections, such as, for example, including at least seven waves in which a wave extends from a trough to an adjacent trough.

In some implementations, at least one of the wave-shaped projections is asymmetric about a peak of the projection or a trough of the projection to control sculpted trailing edge mixing vortices resulting from the wave-shaped projections to improve mixing characteristics. For example, the waved-shape projection may have steeper outboard sides (compared to inboard sides), or vice versa. By one approach, this asymmetry is desirable where there is a corresponding asymmetry of downstream objects.

Figure 9:
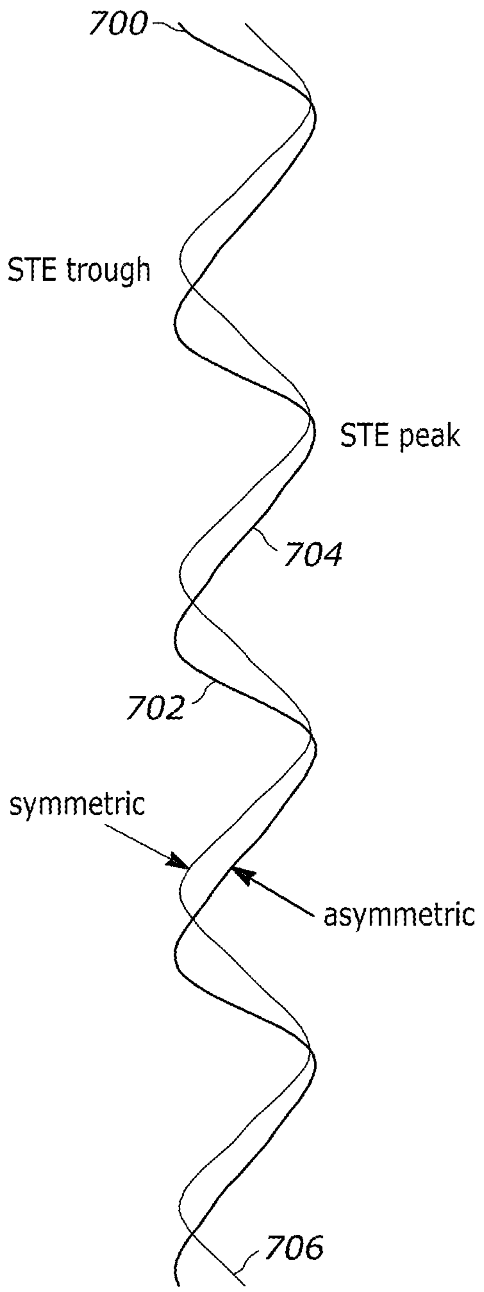
FIG. 9 is a partial view of wave-shaped projections that have asymmetric waveforms in accordance with various embodiments.

In one form, as shown in FIG. 9, the sculpted trailing edge (STE) features include asymmetric waveforms 700. In FIG. 9, chordwise is oriented horizontally from left to right, and spanwise is oriented vertically. For example, after defining the chordwise peak-to-trough length and spanwise wavelength of the sculpted trailing edge design, one may adjust the shape of the waveform between the peaks and troughs to form an asymmetric waveform 700 between peaks and troughs. In this example, the waveform may have a steeper outboard side 702 of each sculpted trailing edge tooth compared to an inboard side 704, or vice versa. FIG. 9 shows a comparison of an asymmetric waveform 700 and a symmetric waveform 706. In some circumstances, this asymmetry improves mixing characteristics. For example, this asymmetry is a consideration to help control the relative strengths of sculpted trailing edge mixing vortices (between positive and negative rotation directions associated with the side edges of each sculpted trailing edge wave feature) when the spanwise loading distribution of the blade aerodynamic design is increasing or decreasing significantly along the span (e.g., non-constant).

In some implementations, a radius of curvature of the peak of at least one of the wave-shaped projections is different than a radius of curvature of an adjacent trough (or other trough). For example, the radius of curvature of the trough may be larger than the radius of curvature of the peak. A difference in radius of curvature is desirable to improve mechanical stress concentrations or manufacturability or to address other factors.

Figure 10:
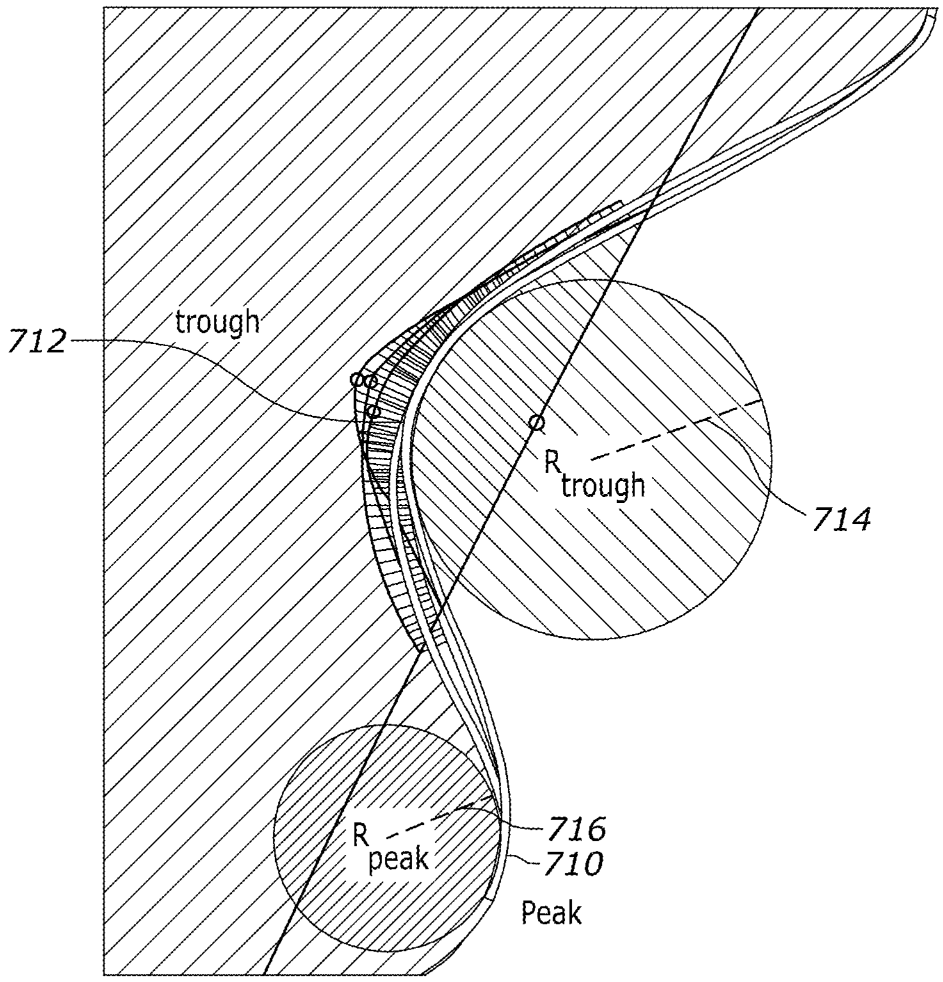
FIG. 10 is a partial view of wave-shaped projections that have asymmetric peak-to-trough curvature in accordance with various embodiments.

In one form, as shown in FIG. 10, there is an asymmetry in the sculpted trailing edge curvature. For example, after defining the chordwise peak-to-trough length and spanwise wavelength of the sculpted trailing edge design, one may adjust the shape of the waveform between the peaks 710 and troughs 712 to alter the distribution of curvature in the planform wave. For example, as shown in FIG. 10, one could increase the radius of curvature at the troughs ($R_{trough}$ 714), while maintaining it (or reducing it) at the peaks ($R_{peak}$ 716). In other words, one could reduce the curvature (increase the radius of curvature) in the troughs by forming a more U-shaped curve along with a more peaked/higher curvature (lower radius of curvature) at the long-chord tips of the sculpted trailing edge features. Other examples of possible curvature asymmetry at the troughs are modeled and shown in FIG. 10. This asymmetry improves mechanical stress concentration for structural design considerations, for example, or improves manufacturability, etc.

In addition, the inventors have used the above iterative design approach to determine a relationship of L/c to other parameters. As stated, the airfoil variable L/c is a general indicator of the length of the wave-shaped projections relative to chord length of the airfoil. This airfoil parameter is compared to the design parameter fan pressure ratio, FPR, of a turbine engine. As addressed further below, in one aspect, it was determined that a relationship exists between L/c and FPR that provides guidance for design of an airfoil with a sculpted trailing edge feature resulting in reduced noise characteristics.

Figure 11:
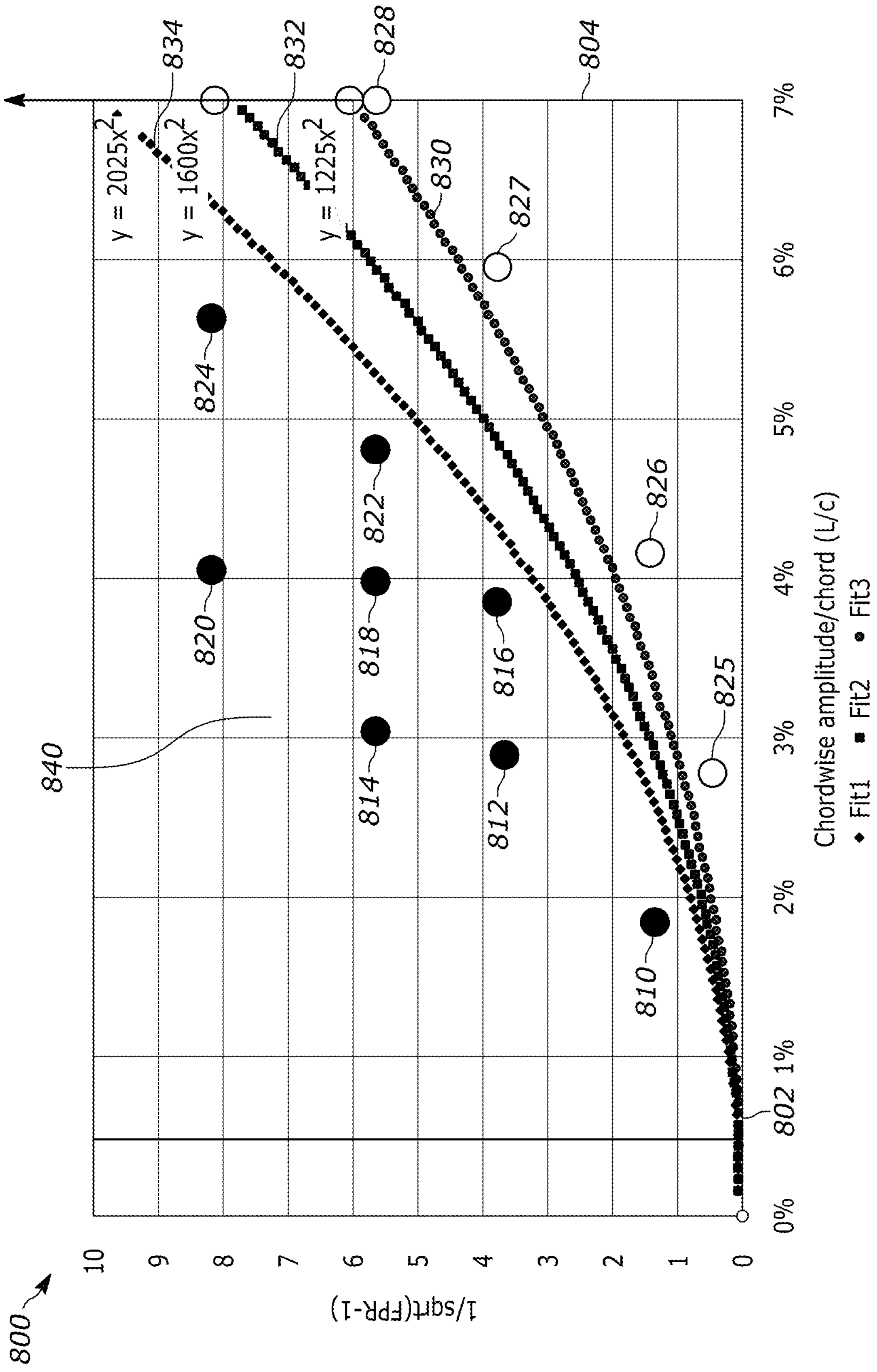
FIG. 11 is a graph showing data points corresponding to design parameters for airfoils involving chordwise amplitude of the wave-shaped projections of the airfoil, chord length of the airfoil, and fan pressure ratio of a turbine engine.

Data points for a relationship of FPR to L/c at design conditions for several airfoils are plotted in a graph in FIG. 11 as graph 800. More specifically, graph 800 shows 1/sqrt (FPR−1) as a function of L/c. The graph 800 includes 1/sqrt (FPR−1) on the y-axis 804, and L/c values (the chordwise amplitude (L) divided by the chord length c) on the x-axis 802 for airfoils at data points 810-824. The graph 800 also includes a first curve 830, a second curve 832 scaled relative to the first curve 830, and a third curve 834 scaled relative to the second curve 832. Airfoils at the data points 810, 812, 814, 816, 818, 820, 822, and 824 above the curves show significant noise reduction. In contrast, airfoils at data points 825, 826, 827, and 828 below the curves show suboptimal noise reduction and increased noise.

It is generally contemplated that each curve is desirable or appropriate in view of certain operating conditions. For example, the sculpted trailing edge design may need to factor in multiple operating conditions (e.g., cruise power coefficient $C_p$ and/or takeoff thrust coefficient $C_T$). Also, designers plan or think differently in the preliminary or detailed design phases (e.g., FPR in early phase as design $C_p$ changes with revolutions per minute (RPM)), so multiple considerations are involved. It is useful to consider multiple facets/ways of describing the design space of interest for sculpted trailing edge wave amplitude as functions of these different aspects of design considerations.

Using the above-mentioned design process, the inventors have discovered a relationship between the amplitude (L) of the wave-shaped projections, the average local chord length (c), and fan pressure ratio (FPR) according to the below relationship for an airfoil:

$$0.005 \le L/c \le 1/\left(B(FPR-1)^{1/4}\right) \le 0.07 \text{ for: } 1.01 < FPR < 2, \quad (3)$$

$$35 \le B \le 200,$$

where amplitude (L) is half of a peak-to-trough distance of a wave-shaped projection, the average local chord length (c) is a chord length being a distance from the leading edge to the trailing edge at a point in a streamwise direction, and B is a non-dimensionalized constant selected within the above range. The ratio of amplitude (L) to average local chord length (c) is a non-dimensionalized amplitude of the wave-shaped projection. The fan pressure ratio (FPR) during subsonic cruise operation is also a non-dimensionalized ratio and is defined by:

$$FPR = P_T(TE)/P_T(LE) \quad (4)$$

where $P_T$ is a total pressure at the trailing edge (TE) and at the leading edge (LE), respectively. FPR is a common fan design metric, but the fan blade loading varies nonlinearly as FPR approaches 1. This nonlinear relationship is a reason for the non-linear equation for FPR in contrast to the linear equations for loading parameters such as power and thrust coefficients addressed in this disclosure.

The inventors have determined that a ratio of amplitude (L) to average local chord length (c), e.g., L/c values, which are greater than 0.005 and less than $1/(B\ (FPR-1)^{1/4}) \le 0.07$ for a fan pressure ratio (FPR) between 1.01 and 2, exclusively, and for B between 35 and 200, inclusively, would result in suitable geometry for the wave-shaped projections (e.g. sculpted trailing edge features) of the airfoil to effectively reduce noise while maintaining high aerodynamic performance. In some implementations, B is greater than or equal to 40, or greater than or equal to 45. In some implementations, as with $C_p$ above, the maximum L/c value may be limited to 0.05 or 0.06 or an L/c in the range between 0.05-0.07 may be selected.

Alternatively, as addressed below and as can be seen from Table 3 below and FIG. 11, a constant parameter may be selected for B in the above equation. The parameter B may be replaced with a constant value selected from the set of 45, 40, or 35. For example, for B=45, the equation would be $0.005 \le L/c \le 1/(45(FPR-1)^{1/4}) \le 0.07$; for B=40, the equation would be $0.005 \le L/c \le 1/(40(FPR-1)^{1/4}) \le 0.07$; and for B=35, the equation would be $0.005 \le L/c \le 1/(35(FPR-1)^{1/4}) \le 0.07$. Each of these equations represents a different coverage of design space, as shown in FIG. 11.

As indicated above, example spanwise amplitudes as a function of a fan pressure ratio at design conditions of several airfoils are plotted in a graph in FIG. 11 as graph 800. The graph 800 includes the L/c values which is the chordwise amplitude divided by the chord on the x-axis 802 and values related to the fan pressure ratio on the y-axis 804. The graph also includes a first curve 830, a second curve 832 scaled relative to the first curve 830, and a third curve 834 scaled relative to the second curve 832. In FIG. 11, curve 630 has an equation of $y=1225x^2$; curve 632 has an equation of $y=1600x^2$; and curve 634 has an equation of $y=2025x^2$; where y=1/sqrt (FPR−1) and x=L/c. In view of the nonlinearity of FPR, this y-axis of 1/sqrt(FPR−1) in view of the L/c along the x-axis results in a relatively straightforward quadratic relationship, as can be seen in FIG. 11.

Table 3 below shows the data points 810-824 and corresponding values for variables $$\frac{1}{\sqrt{(FPR-1)}},$$

L/c, and B. In these examples, the value of B corresponds to the lines 830, 832, and 834 such that the data point is within the corresponding design space. Data points 810-824 fall within acceptable values for the variables (design space above line 830).

TABLE 3

| Data Point | $\frac{1}{\sqrt{(FPR-1)}}$ | L/c | B |
|---|---|---|---|
| 810 | 1.3 | 1.8% | 35, 40, or 45 |
| 812 | 3.7 | 2.9% | 35, 40, or 45 |
| 814 | 5.8 | 3.1% | 35, 40, or 45 |
| 816 | 3.8 | 3.8% | 35, 40, or 45 |
| 818 | 5.8 | 4.0% | 35, 40, or 45 |
| 820 | 8.2 | 4.1% | 35, 40, or 45 |
| 822 | 5.8 | 4.8% | 35, 40, or 45 |
| 824 | 8.2 | 5.6% | 35, 40, or 45 |

Table 4 below shows the data points 825-828 and corresponding values for variables $$\frac{1}{\sqrt{(FPR-1)}},$$

L/c, and B. In these examples, the value of B to satisfy the equation $L/c=1/(B(FPR-1)^{1/4})$ is less than 35. In these examples, as can be seen from the graph in FIG. 11, the data points 825-828 are below curves 830, 832, and 834 and fall outside of acceptable values for the variables.

TABLE 4

| Data Point | $\frac{1}{\sqrt{(FPR-1)}}$ | L/c | B |
|---|---|---|---|
| 825 | 0.5 | 2.7% | Under 35 |
| 826 | 1.4 | 4.2% | Under 35 |
| 827 | 3.9 | 5.9% | Under 35 |
| 828 | 5.8 | 7.0% | Under 35 |

In one form, data points 810-824 represent fan blades having a L/c value for a fan pressure ratio at a design above the first, second, and third curves 830, 832, 834. By one approach, the inventors have determined that a sizing of the wave-shaped projections would result in a suitable geometry when the L/c values is above a minimum threshold (e.g., as indicated by the first curve 830). By one approach, the inventors have found that sizing the wave-shaped projections for associated L/c values within a resulting design space 840 will result in suitable airfoil geometry to reduce noise and achieve high aerodynamic performance. It is generally contemplated that the design space 840 is defined in FIG. 7 between vertical lines for L/c at 0.5% (or 0.005) and 7% (or 0.07) and above curve 830 (or an offset curve 832 or 834). As with $C_p$ addressed above, it is generally contemplated that the minimum for L/c is 0.005 (or 0.5%).

In addition, in a similar manner, the inventors have used the above iterative design approach to determine a relationship of L/c to another parameter, $C_T$, or takeoff thrust coefficient. As stated, the airfoil variable L/c is a general indicator of the length of the wave-shaped projections relative to chord length of the airfoil. This airfoil parameter is compared to the takeoff thrust coefficient, $C_T$, of a turbine engine. As addressed further below, in one aspect, it was determined that a relationship exists between L/c and $C_T$ that provides guidance for design of an airfoil with a sculpted trailing edge feature resulting in reduced noise characteristics.

More specifically, using the above-mentioned design process, the inventors have discovered a relationship between an amplitude (L) of the shaped apart wave-shaped projections, an average local chord length (c), and a takeoff thrust coefficient ($C_T$) according to the below relationship for an airfoil:

$$0.005 < L/c \leq -0.0171^{*}C_T + d_T,\ \text{for } 0.0620 \leq d_T \leq 0.0820, \qquad (5)$$

where $d_T$ is a constant selected within the above range and where $C_T$ is a thrust coefficient of an engine at a Mach 0.25 takeoff condition defined by:

$$C_T = T/(\rho n^2 D^2 A) \qquad (6)$$

where n=revolutions/second of the plurality of airfoils, ρ=air density, A=annular area of each $$\text{airfoil} = \pi\left(r_{T(LE)}^2 - r_{H(LE)}^2\right),$$

where $r_T$ is a tip radius at the leading edge and $r_H$ is a hub radius at the leading edge of each airfoil, D=diameter at the leading edge of each airfoil, T=thrust of a fan of the engine at Mach 0.25 takeoff, for $C_T$ in a range from 0.7 to 3.6, inclusively. The ratio L/c, takeoff thrust coefficient $C_T$, and $d_T$ are all non-dimensional variables/values, and consistent measurement units may be used so long as to result in non-dimensional values.

The inventors have determined that a ratio of amplitude (L) to average local chord length (c), e.g., L/c values, which are greater than 0.005 and less than 0.07 for a thrust coefficient ($C_T$) in a range from 0.7 to 3.6, inclusively, and $0.0620 \leq d_T \leq 0.0820$ would result in suitable geometry for the plurality of wave-shaped projections (e.g. sculpted trailing edge features) of the airfoil to effectively reduce noise while maintaining high aerodynamic performance.

Alternatively, as addressed below and as can be seen from Table 5 below and FIG. 12, a constant parameter may be selected for $d_T$ in the above equation. The parameter $d_T$ may be replaced with a constant value selected from the set of 0.0820, 0.0720, and 0.0620. For example, for $d_T$=0.0820, the equation would be $0.005 < L/c \leq -0.0171^*C_T + 0.0820$; for $d_T$=0.0720, the equation would be $0.005 \leq L/c \leq -0.0027^*C_p + 0.0720$; and for $d_T$=0.0620, the equation would be $0.005 \leq L/c \leq -0.0027^*C_p + 0.0620$. Each of these equations represents a different coverage of design space, as shown in FIG. 12.

Figure 12:
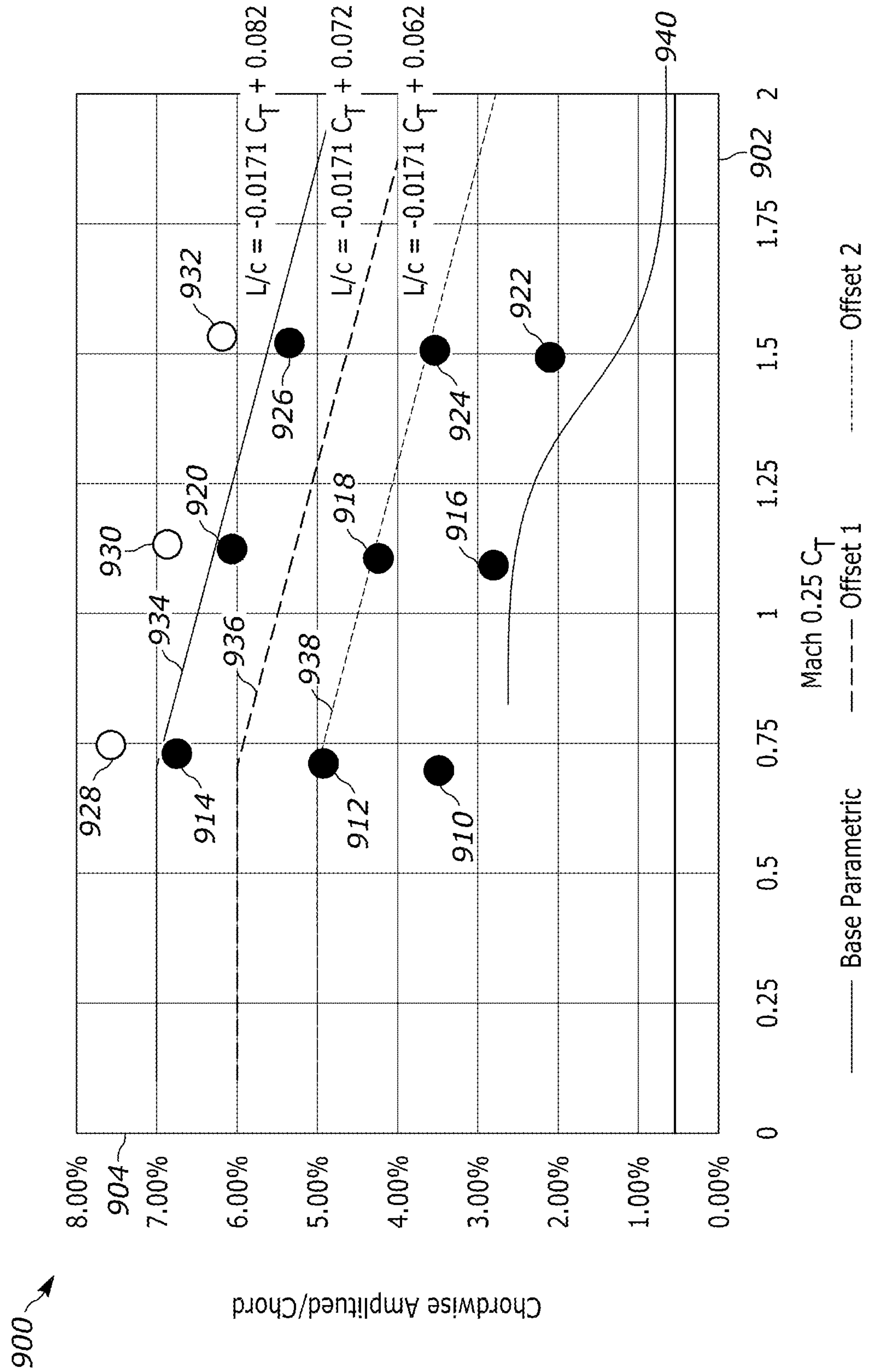
FIG. 12 is a graph showing data points corresponding to design parameters for airfoils involving chordwise amplitude of the wave-shaped projections of the airfoil, chord length of the airfoil, and thrust coefficient of a turbine engine.

Data points for a relationship of L/c to $C_T$ at design conditions for several airfoils are plotted in a graph in FIG. 12 as graph 900. The graph 900 includes L/c values, which is the chordwise amplitude (L) divided by the chord on the y-axis 904, and the thrust coefficient (e.g., at Mach 0.25 takeoff operation) on the x-axis 902 for airfoils at data points 910-926. The graph 900 also includes a first line 934, a second line 936 offset from the first line 934 along the y-axis 904, and a third line 938 offset from the second line 936 along the y-axis 504. In FIG. 12, for $C_T$ greater than or equal to 0.7, line 934 has an equation of $L/c=-0.0171C_T+0.082$; line 936 has an equation of $L/c=-0.0171C_T+0.072$; and line 938 has an equation of $L/c=-0.0171C_T+0.062$. It is understood that airfoils at the data points 910, 912, 914, 916, 918, 920, 922, 924, and 926 below the lines show significant noise reduction. In contrast, airfoils at data points 928, 930, and 932 above the lines show suboptimal or no significant noise reduction, and increased noise. This noise reduction also reduces as L/c reduces to about 0.5% (or 0.005), below which there is negligible noise reduction.

Table 5 below shows the data points 910-926 and corresponding values for variables L/c, $C_T$, and $d_T$. In these examples, the value of $d_T$ corresponds to the lines 934, 936, and 938 such that the data point is within the corresponding design space. Data points 910-926 fall within acceptable values for the variables (design space below line 934) and that data points 928, 930, and 932 fall outside of acceptable values for the variables (design space below line 934).

TABLE 5

| Data Point | L/c | $C_T$ | $d_T$ |
|---|---|---|---|
| 910 | 3.5% | 0.70 | 0.062, 0.072, or 0.082 |
| 912 | 4.9% | 0.72 | 0.062, 0.072, or 0.082 |
| 914 | 6.8% | 0.74 | 0.082 |
| 916 | 2.8% | 1.10 | 0.062, 0.072, or 0.082 |
| 918 | 4.2% | 1.11 | 0.062, 0.072, or 0.082 |
| 920 | 6.1% | 1.12 | 0.082 |
| 922 | 2.1% | 1.50 | 0.062, 0.072, or 0.082 |
| 924 | 3.5% | 1.51 | 0.062, 0.072, or 0.082 |
| 926 | 5.3% | 1.52 | 0.082 |

Table 6 below shows the data points 928-932 and corresponding values for variables L/c, $C_T$, and dr. In these examples, the value of $d_T$ to satisfy the equation $L/c=-0.0171^*C_T+d_T$ would exceed 0.082. In these examples, as can be seen from the graph in FIG. 12, the data points 928-932 are above lines 934, 936, and 938 and fall outside of acceptable values for the variables.

TABLE 6

| Data Point | L/c | $C_T$ | $d_T$ |
|---|---|---|---|
| 928 | 7.6% | 0.75 | Exceeds 0.082 |
| 930 | 6.9% | 1.13 | Exceeds 0.082 |
| 932 | 6.2% | 1.53 | Exceeds 0.082 |

In one form, data points 910-926 represent fan blades having an L/c value for a thrust coefficient at a design below the first, second, or third lines 934, 936, 938. By one approach, the inventors have determined that a sizing of the wave-shaped projections would result in a suitable geometry when the L/c values are below a maximum threshold (e.g., as indicated by the first line 934). By one approach, the inventors have found that sizing the wave-shaped projections for L/c values for a certain Mach 0.25 takeoff $C_T$ within a resulting design space 940 will result in suitable airfoil geometry to reduce noise and achieve high aerodynamic performance. It is generally contemplated that the design space 940 is defined in FIG. 12 between vertical lines at $C_T$=0 and $C_T$=3.6 and between a horizontal minimum line for L/c at 0.5% (or 0.005) and a maximum first line 934 (or an offset second line 936 or third line 938). Although the graph shows an edge at $C_T$=2.0, it is contemplated that the design space 940 extends out to $C_T$=3.6. Also, in some implementations, it may be desirable to limit the design space to the region between any two of the lines 934, 936, and 938 in FIG. 12.

Further aspects of the disclosure are provided by the subject matter of the following clauses:

An airfoil assembly comprising: a plurality of airfoils, at least one airfoil including: a first surface defining a pressure side opposite a second surface defining a suction side, the pressure side and the suction side each extending in an axial direction between a leading edge and a trailing edge, the pressure side and the suction side each extending in a radial direction between an inner root and an outer tip; a plurality of first chord sections defining at least one first chord length, and a plurality of second chord sections defining at least one second chord length, the plurality of first chord sections extending from the leading edge to the trailing edge, and the plurality of second chord sections extending from the leading edge to the trailing edge; a plurality of wave-shaped projections extending along the trailing edge, each wave-shaped projection of the plurality of wave-shaped projections defining a wave peak and a wave trough, wherein adjacent wave-shaped projections define a peak-to-trough distance, the plurality of wave-shaped projections each characterized by an amplitude (L) that is half of the peak-to-trough distance and an average local chord length (c), a chord length being a distance from the leading edge to the trailing edge at a point in a streamwise direction; wherein $0.005 \leq L/c \leq -0.0027*C_p+d_P$, for $0.0527 \leq d_P \leq 0.0727$, and $C_p$ being a power coefficient defined by $C_p=P/(\rho n^3 D^3 A)$ during subsonic cruise operation of an engine, where n=revolutions/second of the plurality of airfoils, ρ=air density, A=annular area defined by the at least one $$\text{airfoil} = \pi\left(r_{T(LE)}^2 - r_{H(LE)}^2\right),$$

where $r_T$ is a tip radius at the leading edge and $r_H$ is a hub radius at the leading edge of the at least one airfoil, D=diameter at the leading edge of the at least one airfoil, and P=power absorbed by the plurality of airfoils at cruise, for $C_p$ in a range from 1 to 10, inclusively, wherein $0.005 \leq L/c \leq 0.07$ for $C_p$ is in a range between but not including 0 to 1.

The airfoil assembly of any preceding clause, wherein at least one of the plurality of airfoils comprises a fan blade.

The airfoil assembly of any preceding clause, wherein at least one chord section of the plurality of first chord sections extends outward from the pressure side at the trailing edge, and at least one chord section of the plurality of second chord sections extends outward from the suction side at the trailing edge.

The airfoil assembly of any preceding clause, wherein at least one of the plurality of wave-shaped projections is asymmetric about a peak of the projection or a trough of the projection.

The airfoil assembly of any preceding clause, wherein a radius of curvature of a peak of at least one of the plurality of wave-shaped projections is different than a radius of curvature of a trough of at least one of the plurality of wave-shaped projections.

The airfoil assembly of any preceding clause, wherein the plurality of wave-shaped projections is integrally formed with the trailing edge.

The airfoil assembly of any preceding clause, wherein L/c is not constant from the inner root to the outer tip of each airfoil.

The airfoil assembly of any preceding clause, wherein $-0.0027*C_p+0.0527 \leq L/c \leq -0.0027*C_p+0.0727$, for $C_p$ in a range from 1 to 10, inclusively, and/or wherein $0.05 \leq L/c \leq 0.07$, for $C_p$ in a range between but not including 0 to 1.

The airfoil assembly of any preceding clause, wherein $0.0527 \leq d_P \leq 0.0627$.

The airfoil assembly of any preceding clause, wherein $d_P=0.0527$.

The airfoil assembly of any preceding clause, wherein the inner root includes an integral dovetail for mounting the at least one airfoil.

The airfoil assembly of any preceding clause, wherein the plurality of first chord sections each have the one first chord length and the plurality of second chord sections (164) each have the one second chord length, the one first chord length being greater than the one second chord length.

The airfoil assembly of any preceding clause, wherein the plurality of first chord sections each extend to a peak of a wave-shaped projection and the plurality of second chord sections each extend to a trough of a wave-shaped projection.

The airfoil assembly of any preceding clause, wherein the number of wave-shaped projections along the trailing edge is at least seven.

An airfoil assembly comprising: a plurality of airfoils, at least one airfoil including: a first surface defining a pressure side opposite a second surface defining a suction side, the pressure side and the suction side each extending in an axial direction between a leading edge and a trailing edge, the pressure side and the suction side each extending in a radial direction between an inner root and an outer tip; a plurality of first chord sections defining at least one first chord length, and a plurality of second chord sections defining at least one second chord length, the plurality of first chord sections extending from the leading edge to the trailing edge, and the plurality of second chord sections extending from the leading edge to the trailing edge; a plurality of wave-shaped projections extending along the trailing edge, each wave-shaped projection of the plurality of wave-shaped projections defining a wave peak and a wave trough, wherein adjacent wave-shaped projections define a peak-to-trough distance, the plurality of wave-shaped projections each characterized by an amplitude (L) that is half of the peak-to-trough distance and an average local chord length (c), a chord length being a distance from the leading edge to the trailing edge at a point in a streamwise direction; wherein $0.005 \leq L/c \leq 1/(B(FPR-1)^{1/4}) \leq 0.07$ for: $1.01 < FPR < 2$, $35 \leq B \leq 200$; wherein FPR is a fan pressure ratio for subsonic cruise operation of an engine defined by $FPR=P_T(TE)/P_T(LE)$ where $P_T$ is a total pressure at the trailing edge and at the leading edge, respectively.

The airfoil assembly of any preceding clause, wherein at least one of the plurality of airfoils comprises a fan blade.

The airfoil assembly of any preceding clause, wherein a number of waves of the wave-shaped projections along the trailing edge, each wave being defined from a trough to an adjacent trough, is at least seven.

The airfoil assembly of any preceding clause, wherein $B \geq 40$.

The airfoil assembly of any preceding clause, wherein $B \geq 45$.

An airfoil assembly for a turbine engine having a fan with a plurality of fan blades, the airfoil assembly comprising: a plurality of airfoils, each airfoil including: a first surface defining a pressure side opposite a second surface defining a suction side, the pressure side and the suction side each extending in an axial direction between a leading edge and a trailing edge, the pressure side and the suction side each extending in a radial direction between an inner root and an outer tip; a plurality of first chord sections defining at least one first chord length, and a plurality of second chord sections defining at least one second chord length, the plurality of first chord sections extending from the leading edge to the trailing edge, and the plurality of second chord sections extending from the leading edge to the trailing edge; a plurality of wave-shaped projections extending along the trailing edge, each wave-shaped projection of the plurality of wave-shaped projections defining a wave peak and a wave trough, wherein adjacent wave-shaped projections define a peak-to-trough distance, the plurality of wave-shaped projections each characterized by an amplitude (L) that is half of the peak-to-trough distance and an average local chord length (c), a chord length being a distance from the leading edge to the trailing edge at a point in a streamwise direction; wherein $0.005 < L/c \leq -0.0171 * C_T + d_T$, for $0.0620 \leq d_T \leq 0.0820$, and $C_T$ is a thrust coefficient of an engine at a Mach 0.25 takeoff condition defined by $C_T = T/(\rho n^2 D^2 A)$ where n=revolutions/second of the plurality of airfoils, ρ=air density, A is the annular area defined by the at least one airfoil, $$A = \pi\left(r_{T(LE)}^2 - r_{H(LE)}^2\right),$$

where $r_T$ is a tip radius at the leading edge and $r_H$ is a hub radius at the leading edge of the at least one airfoil, D=the diameter at the leading edge of the at least one airfoil, T=thrust of a fan of the engine, for $C_T$ in a range from 0.7 to 3.6, inclusively.

The airfoil assembly of any preceding clause, wherein at least one of the plurality of airfoils comprises a fan blade.

The airfoil assembly of any preceding clause, wherein a number of waves of the wave-shaped projections along the trailing edge, each wave being defined from a trough to an adjacent trough, is at least seven.

The airfoil assembly of any preceding clause, wherein $0.0620 \leq d_T \leq 0.0720$.

The airfoil assembly of any preceding clause, wherein $d_T = 0.0620$.

It will be understood that various changes in the details, materials, and arrangements of parts and components which have been herein described and illustrated to explain the nature of the disclosure may be made by those skilled in the art within the principle and scope of the appended claims. Furthermore, while various features have been described with regard to particular embodiments, it will be appreciated that features described for one embodiment also may be incorporated with the other described embodiments.

What is claimed is:

1. An airfoil assembly comprising:

a plurality of airfoils, at least one airfoil of the plurality of airfoils including:

a first surface defining a pressure side opposite a second surface defining a suction side, the pressure side and the suction side each extending in an axial direction between a leading edge and a trailing edge, the pressure side and the suction side each extending in a radial direction between an inner root and an outer tip;

a plurality of first chord sections defining at least one first chord length, and a plurality of second chord sections defining at least one second chord length, the plurality of first chord sections extending from the leading edge to the trailing edge, and the plurality of second chord sections extending from the leading edge to the trailing edge; and a plurality of wave-shaped projections extending along the trailing edge, each wave-shaped projection of the plurality of wave-shaped projections defining a wave peak and a wave trough, wherein adjacent wave-shaped projections define a peak-to-trough distance, the plurality of wave-shaped projections each characterized by an amplitude (L) that is half of the peak-to-trough distance and an average local chord length (c), a chord length being a distance from the leading edge to the trailing edge at a point in a streamwise direction;

wherein $0.005 \leq L/c \leq -0.0027 * C_p + d_P$, for $0.0527 \leq d_P \leq 0.0727$, and $C_p$ being a power coefficient defined by $C_p = P/(\rho n^3 D^3 A)$ during subsonic cruise operation of an engine, where n=revolutions/second of the plurality of airfoils, ρ=air density, A is an annular area defined by the at least one airfoil, $$A = \pi\left(r_{T(LE)}^2 - r_{H(LE)}^2\right),$$

where $r_T$ is a tip radius at the leading edge and $r_H$ is a hub radius at the leading edge of the at least one airfoil, D=diameter at the leading edge of the at least one airfoil, and P=power absorbed by the plurality of airfoils, for $C_p$ in a range from 1 to 10, inclusively;

wherein $0.005 \leq L/c \leq 0.07$ for $C_p$ is in a range between but not including 0 to 1;

wherein the inner root includes an integral dovetail for mounting the at least one airfoil.

2. The airfoil assembly of claim 1, wherein at least one airfoil of the plurality of airfoils comprises a fan blade.

3. The airfoil assembly of claim 1, wherein at least one chord section of the plurality of first chord sections extends outward from the pressure side at the trailing edge, and at least one chord section of the plurality of second chord sections extends outward from the suction side at the trailing edge.

4. The airfoil assembly of claim 1, wherein at least one of the plurality of wave-shaped projections is a projection that is asymmetric about a wave peak of the projection or a wave trough of the projection.

5. The airfoil assembly of claim 1, wherein a radius of curvature of a wave peak of at least one of the plurality of wave-shaped projections is different than a radius of curvature of a wave trough of at least one of the plurality of wave-shaped projections.

6. The airfoil assembly of claim 1, wherein the plurality of wave-shaped projections is integrally formed with the trailing edge.

7. The airfoil assembly of claim 1, wherein L/c is not constant from the inner root to the outer tip of at least one of the plurality of airfoils.

8. The airfoil assembly of claim 1, wherein $-0.0027*C_p+0.0527 \leq L/c \leq -0.0027*C_p+0.0727$, for $C_p$ in a range from 1 to 10, inclusively, and wherein $0.05 \leq L/c \leq 0.07$, for $C_p$ in a range between but not including 0 to 1.

9. The airfoil assembly of claim 1, wherein $0.0527 \leq d_P \leq 0.0627$.

10. The airfoil assembly of claim 1, wherein $d_P=0.0527$.

11. An airfoil assembly comprising:

a plurality of airfoils, at least one airfoil of the plurality of airfoils including:

a first surface defining a pressure side opposite a second surface defining a suction side, the pressure side and the suction side each extending in an axial direction between a leading edge and a trailing edge, the pressure side and the suction side each extending in a radial direction between an inner root and an outer tip;

a plurality of first chord sections defining at least one first chord length, and a plurality of second chord sections defining at least one second chord length, the plurality of first chord sections extending from the leading edge to the trailing edge, and the plurality of second chord sections extending from the leading edge to the trailing edge; and a plurality of wave-shaped projections extending along the trailing edge, each wave-shaped projection of the plurality of wave-shaped projections defining a wave peak and a wave trough, wherein adjacent wave-shaped projections define a peak-to-trough distance, the plurality of wave-shaped projections each characterized by an amplitude (L) that is half of the peak-to-trough distance and an average local chord length (c), a chord length being a distance from the leading edge to the trailing edge at a point in a streamwise direction;

wherein $0.005 \leq L/c \leq 1/(B(FPR-1)^{1/4}) \leq 0.07$ for: $1.01 < FPR < 2$, $35 \leq B \leq 200$; and wherein FPR is a fan pressure ratio for subsonic cruise operation of an engine defined by $FPR=P_T(TE)/P_T(LE)$ where $P_T$ is a total pressure at the trailing edge and at the leading edge, respectively, wherein the inner root includes an integral dovetail for mounting the at least one airfoil.

12. The airfoil assembly of claim 11, wherein at least one of the plurality of airfoils comprises a fan blade.

13. The airfoil assembly of claim 11, wherein a number of waves of the wave-shaped projections along the trailing edge, each wave being defined from a wave trough to an adjacent wave trough, is at least seven.

14. The airfoil assembly of claim 11, wherein $B \geq 40$.

15. The airfoil assembly of claim 11 wherein $B \geq 45$.

16. An airfoil assembly for a turbine engine having a fan with a plurality of fan blades, the airfoil assembly comprising:

a plurality of airfoils, at least one airfoil of the plurality of airfoils including:

a first surface defining a pressure side opposite a second surface defining a suction side, the pressure side and the suction side each extending in an axial direction between a leading edge and a trailing edge, the pressure side and the suction side each extending in a radial direction between an inner root and an outer tip;

a plurality of first chord sections defining at least one first chord length, and a plurality of second chord sections defining at least one second chord length, the plurality of first chord sections extending from the leading edge to the trailing edge, and the plurality of second chord sections extending from the leading edge to the trailing edge; and a plurality of wave-shaped projections extending along the trailing edge, each wave-shaped projection of the plurality of wave-shaped projections defining a wave peak and a wave trough, wherein adjacent wave-shaped projections define a peak-to-trough distance, the plurality of wave-shaped projections each characterized by an amplitude (L) that is half of the peak-to-trough distance and an average local chord length (c), a chord length being a distance from the leading edge to the trailing edge at a point in a streamwise direction;

wherein $0.005 < L/c \leq -0.0171*C_T+d_T$, for $0.0620 \leq d_T \leq 0.0820$, and $C_T$ is a thrust coefficient of an engine at a Mach 0.25 takeoff condition defined by $C_T=T/(\rho n^2 D^2 A)$ where n=revolutions/second of the plurality of airfoils, ρ=air density, A is the annular area defined by the at least one airfoil, $$A = \pi\left(r_{T(LE)}^2 - r_{H(LE)}^2\right),$$

where $r_T$ is a tip radius at the leading edge and $r_H$ is a hub radius at the leading edge of the at least one airfoil, D=diameter at the leading edge of the at least one airfoil, T=thrust of a fan of the engine, for $C_T$ in a range from 0.7 to 3.6, inclusively, wherein the inner root includes an integral dovetail for mounting the at least one airfoil.

17. The airfoil assembly of claim 16, wherein at least one of the plurality of airfoils comprises a fan blade.

18. The airfoil assembly of claim 16, wherein a number of waves of the wave-shaped projections along the trailing edge, each wave being defined from a wave trough to an adjacent wave trough, is at least seven.

19. The airfoil assembly of claim 16, wherein $0.0620 \leq d_T \leq 0.0720$.

20. The airfoil assembly of claim 16, wherein $d_T=0.0620$.

* * * * *